(12) United States Patent
Akatsuka

(10) Patent No.: US 8,516,992 B2
(45) Date of Patent: Aug. 27, 2013

(54) THROTTLE CONTROL DEVICE AND VEHICLE EQUIPPED WITH THE SAME

(75) Inventor: Hidenori Akatsuka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1029 days.

(21) Appl. No.: 12/552,692

(22) Filed: Sep. 2, 2009

(65) Prior Publication Data

US 2010/0059018 A1  Mar. 11, 2010

(30) Foreign Application Priority Data

Sep. 5, 2008  (JP) ................ 2008-229094

(51) Int. Cl.
 *F02D 41/08* (2006.01)
 *F02D 41/26* (2006.01)

(52) U.S. Cl.
 USPC ........................................ 123/399

(58) Field of Classification Search
 USPC ........................................ 123/399
 See application file for complete search history.

(56) References Cited

U.S. PATENT DOCUMENTS

| | | | | |
|---|---|---|---|---|
| 4,301,883 A * | 11/1981 | Collonia | ............... | 180/179 |
| 4,470,396 A * | 9/1984 | Hasumi et al. | ............... | 123/488 |
| 4,519,360 A * | 5/1985 | Murakami | ............... | 123/399 |
| 4,671,235 A * | 6/1987 | Hosaka | ............... | 123/352 |
| 4,729,356 A * | 3/1988 | Kaneko et al. | ............... | 123/361 |
| 4,962,570 A * | 10/1990 | Hosaka et al. | ............... | 123/399 |
| 5,383,431 A * | 1/1995 | Nishimura et al. | ............... | 123/399 |
| 5,391,127 A * | 2/1995 | Nishimura | ............... | 477/110 |
| 5,521,825 A * | 5/1996 | Unuvar et al. | ............... | 123/339.1 |
| 5,558,062 A * | 9/1996 | De Minco et al. | ............... | 123/361 |
| 5,626,120 A * | 5/1997 | Akatsuka | ............... | 123/479 |
| 5,860,405 A * | 1/1999 | Muramatsu et al. | ............... | 477/111 |
| 6,044,318 A | 3/2000 | Bourdon et al. | | |
| 6,709,302 B2 * | 3/2004 | Yanagihara | ............... | 440/1 |
| 6,855,092 B2 * | 2/2005 | Duty et al. | ............... | 477/121 |
| 7,549,649 B2 * | 6/2009 | Baldet | ............... | 280/5.519 |
| 7,890,241 B2 * | 2/2011 | Russell | ............... | 701/103 |

(Continued)

FOREIGN PATENT DOCUMENTS

| | | |
|---|---|---|
| EP | 0 106 360 A2 | 4/1984 |
| GB | 2 445 325 A | 7/2008 |
| JP | 62-318032 | 6/1989 |

OTHER PUBLICATIONS

Official Communication issued in corresponding European Patent Application No. 09011017, completed on Mar. 10, 2010.

*Primary Examiner* — Stephen K Cronin
*Assistant Examiner* — Arnold Castro
(74) *Attorney, Agent, or Firm* — Keating & Bennett, LLP

(57) ABSTRACT

In some embodiments, a throttle control device includes an axel 43 for opening and closing a throttle valve 41, an axel sensor 52 for detecting an operation amount of the axel 43, a throttle control portion 71 for controlling the throttle valve 41, a memory portion 72 for storing a plurality of control modes 81, 82, and 83 in which a targeted throttle opening degree for the operation amount is determined, a change-over switch 122 for instructing the changing of the control mode, a judgment portion 73a for judging whether or not the operation amount of the axel 43 is equal to or less than the predetermined operation amount, and a changing portion 73b for changing the control mode when the switch 122 is operated and the operation amount of the axel 43 is equal to or less than the predetermined operation amount.

19 Claims, 22 Drawing Sheets

(56) References Cited

U.S. PATENT DOCUMENTS

| | | | |
|---|---|---|---|
| 8,165,780 B2* | 4/2012 | Russell | 701/103 |
| 2003/0013354 A1* | 1/2003 | Yanagihara | 440/1 |
| 2005/0098127 A1* | 5/2005 | Eiraku | 123/90.15 |
| 2005/0263132 A1* | 12/2005 | Yanagihara | 123/399 |
| 2007/0271026 A1* | 11/2007 | Hijikata | 701/103 |
| 2007/0276549 A1* | 11/2007 | Hijikata | 701/1 |
| 2008/0115761 A1 | 5/2008 | Deguchi et al. | |
| 2010/0282210 A1* | 11/2010 | Itagaki | 123/399 |

* cited by examiner

THROTTLE CONTROL DEVICE AND VEHICLE EQUIPPED WITH THE SAME

This application claims priority under 35 U.S.C. §119 to Japanese Patent Application No. 2008-229094 filed on Sep. 5, 2008, the entire disclosure of which is incorporated herein by reference in its entirety.

BACKGROUND

1. Field of the Invention

The preferred embodiments of the present invention relate, inter alia, to a throttle control device, and a vehicle equipped with the throttle control device.

2. Description of the Related Art

The following description sets forth the inventor's knowledge of related art and problems therein and should not be construed as an admission of knowledge in the prior art.

Conventionally, a vehicle equipped with a throttle valve for adjusting an output of an internal combustion engine such as an engine and a throttle operator for opening and closing the throttle valve has been known. In addition, a throttle control device for controlling the opening degree of the throttle valve depending on an operation amount of a throttle operator has also be known. The throttle control device stores the control mode information in which the relationship between the operation amount of the throttle operator and the targeted opening degree of the throttle valve (hereinafter referred to as "targeted throttle opening degree") is determined. The throttle control device is configured to calculate a targeted throttle opening degree by receiving the operation amount information of the throttle operator and control the throttle valve so that the opening degree of the throttle valve becomes the targeted throttle opening degree. Japanese Patent No. 2,526,612 (hereinafter referred to as "Patent Document 1") describes a throttle control device in which a plurality of control mode information is stored and the control mode can be changed with a switch.

The throttle control device disclosed by Patent Document 1 calculates the opening degree difference between the targeted throttle opening degree in the currently used control mode and the targeted throttle opening degree in the control mode newly selected by operating the switch. Also, the aforementioned throttle control device judges whether or not the absolute value of the opening degree difference is the permissible value or below. When the absolute value exceeds the permissible value when the switch is operated, the throttle control device considers it to be inappropriate to change the control mode and does not perform the change. The throttle control device changes the control mode only when the absolute value is the permissible value or below. The absolute value changes in accordance with the rotation speed of the aforementioned engine.

With the aforementioned control, the throttle control device prevents the sudden changes of the opening degree of the throttle valve at the time of changing the control mode. This allows the throttle control device to prevent excessive torque fluctuations of the engine at the time of changing the control mode.

As described above, even if the switch is operated, in cases where the aforementioned absolute value exceeds the permissible value, the throttle control device does not change the control mode until the absolute value becomes the permissible value or below. Therefore, in the throttle control device, the control mode change timing was not clear to the person operating the switch. Furthermore, in the throttle control device, when changing the control mode, it is required to perform the processing of calculating the opening degree difference between the targeted throttle opening degree in the currently used control mode and the targeted throttle opening degree in the control mode to be newly selected. Furthermore, it is also required to perform the processing of judging whether or not the absolute value of the opening degree difference is the permissible value or below. This requires the aforementioned throttle control device to perform complicated arithmetic processing.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a throttle control device in which the arithmetic processing for changing the control mode is easy or the change timing with respect to the control mode change operation is clear.

Among other potential advantages, some embodiments can provide a vehicle equipped with the aforementioned throttle control device.

According to a first aspect in some embodiments of the present invention, a throttle control device includes a throttle operator for opening and closing the throttle valve, a sensor for detecting an operation amount of the throttle operator, a control device for controlling the throttle valve so that an opening degree of the throttle valve becomes a targeted throttle opening degree, a memory device for storing information on a plurality of control modes in which the targeted throttle opening degree for the operation amount is determined, a change-over instruction device for instructing changing of the control mode, a judgment device for judging whether or not the operation amount of the throttle operator is equal to or less than the predetermined operation amount, and a changing device for changing the control mode when the change-over instruction device is operated and the operation amount of the throttle operator is equal to or less than the predetermined operation amount.

According to the second aspect in some embodiments of the present invention, a vehicle includes, an engine, a driving wheel driven by receiving a driving force of the engine, and a throttle control device. The throttle control device is equipped with a throttle operator for opening and closing the throttle valve, a sensor for detecting an operation amount of the throttle valve, a control device for controlling the throttle valve so that an opening degree of the throttle valve becomes a targeted throttle opening degree, a memory device for storing information on a plurality of control modes in which the targeted throttle opening degree for the operation amount is determined, a change-over instruction device for instructing changing of the control mode, a judgment device for judging whether or not the operation amount of the throttle operator is equal to or less than the predetermined value, and a changing device for changing the control mode when the change-over instruction device is operated and the driving force transmitted to the driving wheel is equal to or less than the predetermined value.

According to the third aspect in some embodiments of the present invention, a vehicle is equipped with an engine, a driving wheel driven by receiving a driving force of the engine, and a throttle control device. The throttle control device includes a throttle operator for opening and closing a throttle valve, a sensor for detecting an operation amount of the throttle valve, a control device for control the throttle valve so that an opening degree of the throttle valve becomes a targeted throttle opening degree, a memory device for storing information on a plurality of control modes in which a targeted throttle opening degree for the operation amount is determined, a change-over instruction device for instructing changing of the control mode, a judgment device for judging whether or not the driving force transmitted to the driving wheel is equal to or less than a predetermined value, and a changing device for changing the control mode when the change-over instruction device is operated and the driving force transmitted to the driving wheel is equal to or less than a predetermined value.

According to the preferred embodiments of the aforementioned throttle control device and vehicle equipped with the throttle control device, when changing the control mode, it is not necessary to calculate an opening degree difference between a targeted throttle opening degree in the control mode before changing and a targeted throttle opening degree in the control mode after changing. Therefore, the preferred embodiments of the present invention make processing, such as, e.g., a calculation for changing the control mode, easy.

In addition, according to the aforementioned throttle control device and vehicle of the preferred embodiments, the execution of the control mode change is limited only when the change-over instruction device is operated and the operation amount of the throttle operator is equal to or less than the predetermined operation amount. Both the change-over instruction device and the throttle operator are operated by a rider. Therefore, it is clear for the rider whether or not the switching instruction device has been switched and whether or not the operation amount of the throttle operator is the predetermined operation amount or less. Therefore, according to the present invention, the control mode change timing for the control mode change operation is clear.

As will be apparent from the above, according to the aforementioned preferred embodiments, it is possible to provide a throttle control device and a vehicle in which an arithmetic processing for performing the control mode change is easy and a control mode change timing for the control mode change operation is clear.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Embodiment 1

Hereinafter, a throttle control device and a vehicle according to this embodiment will be explained. In the following description, a front-and-rear direction, a right-and-left direction, and an up-and-down direction are defined as a direction as viewed from a rider riding on a seat 3 mentioned below unless otherwise specifically specified.

Figure 1:
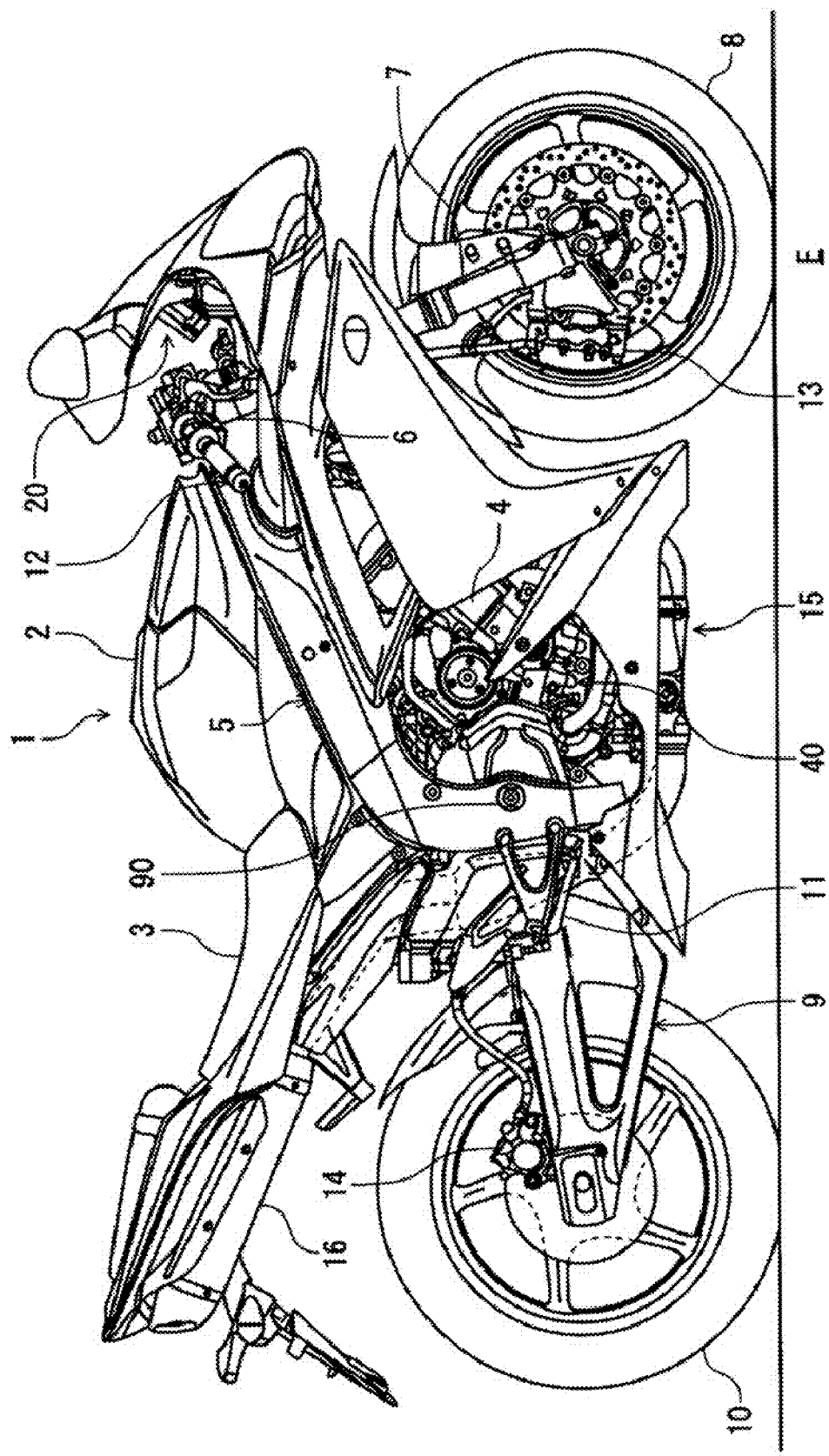
FIG. 1 is a right side view of a motorcycle.

FIG. 1 shows a two-wheeled motor vehicle 1 which is an example of a vehicle. The two-wheeled motor vehicle 1 is not limited in type, and can be, for example, a motorcycle, a scooter, a moped, or a motorcrosser. Also, it should be noted that in the present invention, the vehicle can include any vehicle in which a rider sits astride or a straddle-type vehicle, and is not limited to a motorcycle or a two-wheeled motor vehicle but can include any vehicle, including a three-wheel or four-wheel vehicle, such as, e.g., an ATV (All-Terrain Vehicle). In this disclosure, it should be understood that, e.g., such a four-wheel vehicle encompassed herein can include, e.g., a side-by-side vehicle (SSV) (e.g., in which at least some passengers seats are situated side-by-side). Side-by-side vehicles are often constructed for off road use and referred to as "off-road vehicles." In this disclosure, the "straddle-type vehicle" includes a vehicle of a type in which a rider's legs can span across a substantial portion of the vehicle or straddles the vehicle (e.g., straddling a seat thereof). The terminology straddle-type vehicle also includes, for example, motorcycles (e.g., on and/or off road motorcycles, scooters, mopeds, etc.), all terrain vehicles (ATVs), vehicles with two or more wheels, and vehicles with less than two wheels, such as snowmobiles. In the present application, the terminology "motorcycle" includes a "two-wheeled motor vehicle" and refers to a motorcycle in a broad sense. In this regard, the language "motorcycle in a broad sense" includes all types of motorcycles, including, on and/or off road motorcycles, scooters, mopeds, off-road vehicles with varied numbers of wheels, etc. The terminology motorcycle as used herein, thus, also includes vehicles that have one or more front and/or rear sets of wheels with multiple wheels. In general, most motorcycles are configured such that during changing of the travel direction, a rider inclines the vehicle body.

Overall Structure of Motorcycle:

As shown in FIG. 1, the motorcycle 1 is equipped with a fuel tank 2, a seat 3, and an engine 4, and a vehicle body frame 5 supporting them. A head pipe 6 is provided on the front side of the vehicle body frame 5, and a handle 12 is provided above the upper portion of the head pipe 6. Also, front forks 7 are provided on the lower side of the handle 12. A front wheel 8 is rotatably supported by the lower end portions of the front forks 7. Swing arms 9 are supported by the vehicle body frame 5. Each swing arm 9 is swingable about the pivot portion 90. A rear wheel 10 as a driving wheel is rotatably supported by the back end portions of the swing arms 9. A front wheel brake mechanism 13 is provided to the front wheel 8. A rear wheel brake mechanism 14 is provided to the rear wheel 10. Also, a meter panel 20 is provided in front of the handle 12. The meter panel 20 displays information needed while traveling on the motorcycle 1.

The rear wheel 10 is connected to a power unit 40, such as, e.g., an engine 4, via a power transmission mechanism 46 (see, e.g., FIG. 11), such as, e.g., a chain. This allows transmission of the power of the engine 4 to the rear wheel 10 to thereby rotate the rear wheel 10. In this motorcycle, the power unit 40 is equipped with at least an engine 4, a clutch 45, and a transmission 44 which will be described later. The type of the power transmission mechanism 46 is not specifically limited. The power transmission mechanism 46 can be a belt driven mechanism in which the rotation of the engine 4 is transmitted to the rear wheel 10 with a belt. Also, the power transmission mechanism 46 can be a chain driven mechanism in which the rotation of the engine 4 is transmitted to the rear wheel 10 with a chain, or a shaft driven mechanism in which the rotation of the engine 4 is transmitted with a shaft.

An exhaust pipe 15 is connected to the engine 4. The exhaust pipe 15 is connected to the front side or rear side of the engine 4, and extends rearwardly upward. A muffler 16 is attached to the rear end of the exhaust pipe 15.

Figure 2:
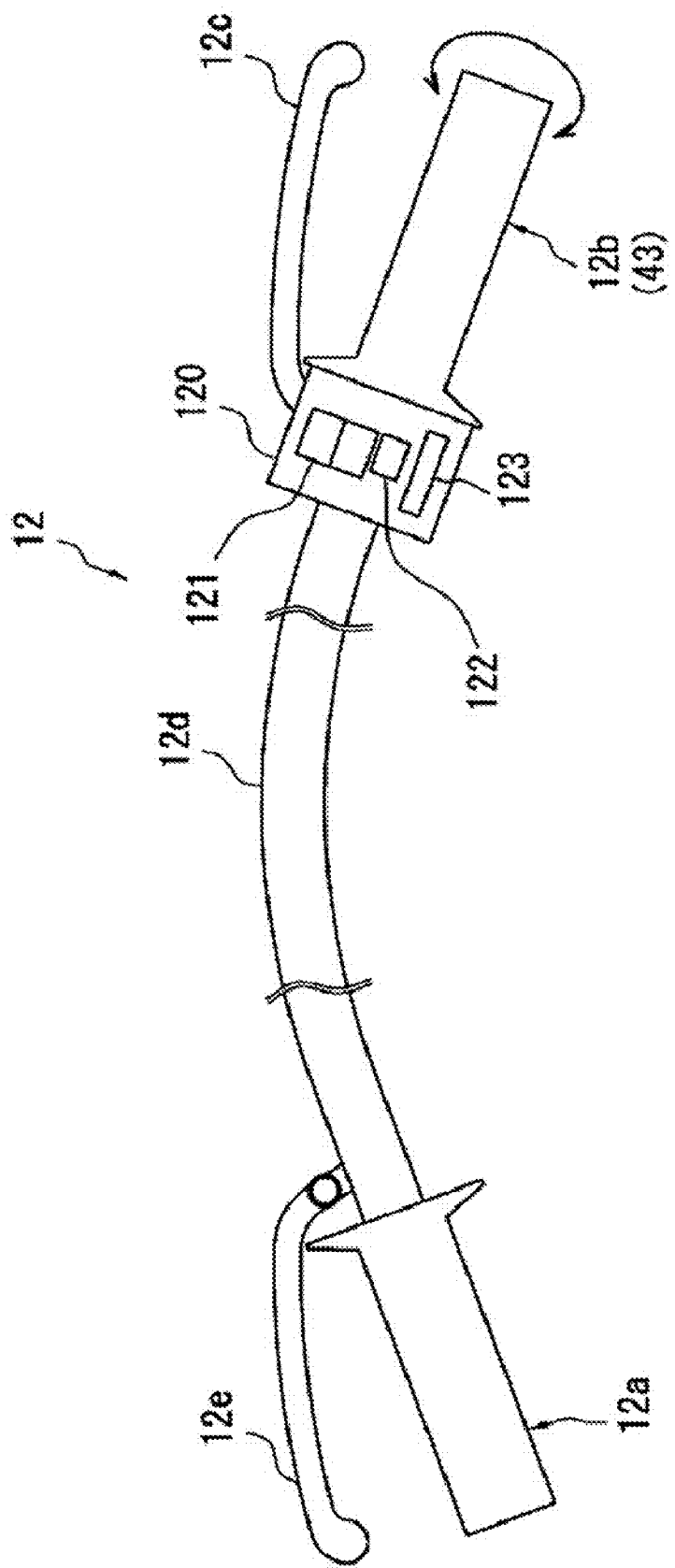
FIG. 2 is a schematic structural view of a handle of the motorcycle.

Handle:

FIG. 2 is a schematic structural view of the handle 12. The handle 12 is provided with a handle bar 12d connected to a steering head pipe not shown in the drawing. The handle 12 is provided with a left grip 12a positioned at the left end portion of the handle bar 12d and a right grip 12b positioned at the right end portion of the handle bar 12d. The right grip 12b is rotatable with respect to the handle bar 12d. When a rider rotates the right grip 12b, the throttle opening degree of the engine 4 which will be explained later is adjusted. Hereinafter, the right grip 12b is called an axel 43.

A right lever 12c is provided in the vicinity of the axel 43. Also, a left lever 12e is provided in the vicinity of the left grip 12a. The operation of the right lever 12c or the left lever 12e by a rider causes an operation of the brake of the motorcycle 1. The operation of the right lever 12c by a rider causes, for example, an operation of a front wheel brake mechanism 13 (see FIG. 1). Also, the operation of the left lever 12e by a rider causes, for example, an operation of a rear brake mechanism 14 (see FIG. 1). However, it can be configured such that the rear brake mechanism 14 is activated by the operation of the brake lever 11 (see FIG. 1). The brake lever 11 is provided at the right side of the vehicle body so as to be positioned below the seat 3 and ahead of the rear wheel 10. When the front wheel brake mechanism 13 is activated, a braking force is generated mainly between the front wheel 8 and a road surface E. On the other hand, when the rear wheel brake mechanism 14 is activated, a braking force is generated mainly between the rear wheel 10 and a road surface E. However, in cases where the motorcycle 1 is equipped with a clutch 45 described later (see, e.g., FIG. 15), the left lever 12e will be a clutch lever for operating the clutch 45. The clutch 45 transmits the driving force between the engine 4 and the rear wheel 10 in an engageable and disengageable manner.

A switch panel 120 is arranged on the left side portion of the axel 43, or the inner side portion of the vehicle body. The switch panel 120 and the right grip 12b can be positioned adjacent to each other or can be separated by a predetermined distance. The switch panel 120 is provided with a kill switch 121, a starter switch 123, and a change-over switch 122. As for its vertical placement, the change-over switch 122 is placed between, for example, the kill switch 121 and the starter switch 123. As will be described below, when the change-over switch 122 is operated, a signal instructing to change the control mode is transmitted to an ECU 70 (see, e.g., FIG. 4).

The change-over switch 122 is provided on the front surface of the switch panel 120. With this, the change-over switch 122 can be manipulated easily using a rider's right thumb. The change-over switch 122 is, for example, a push type button. The change-over switch 122 can be arranged on the rear surface of the switch panel 120 (the rear side of FIG. 3). In this case, the change-over switch 122 can be easily manipulated with a rider's forefinger or the like. The change-over switch 122 is not limited to a push type button. The change-over switch 122 can be, for example, a slide switch.

Figure 4:
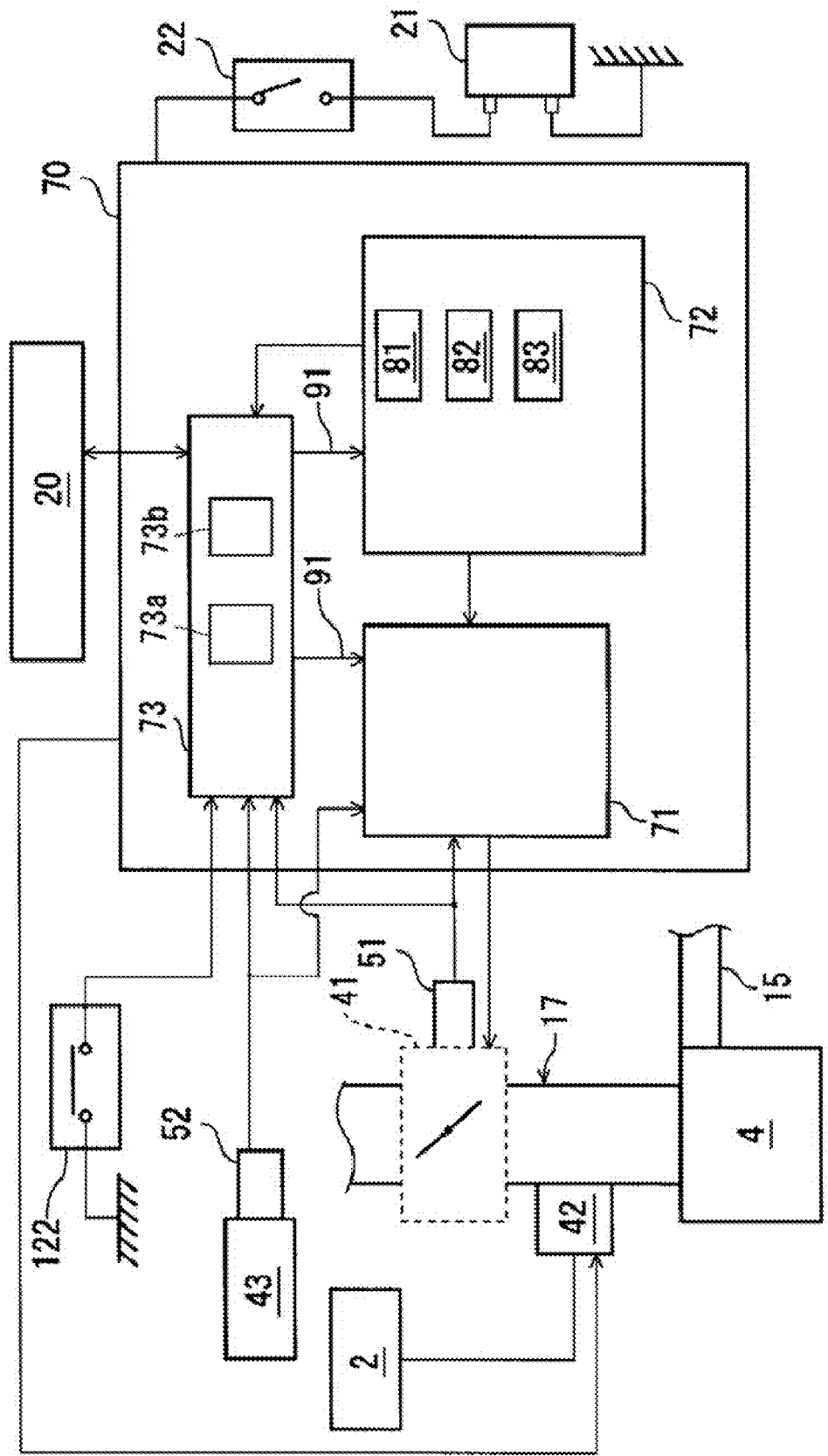
FIG. 4 is a structural view of a throttle control device of the motorcycle according to Embodiment 1.

Throttle Control Device:

Hereinafter, a throttle control device according to preferred embodiments of the present invention will be described. The motorcycle 1 is equipped with an ECU (Electric Control Unit) 70 which controls the engine 4. As shown in FIG. 4, the ECU 70 includes a throttle control portion 71 which controls a throttle valve 41 and a memory portion 72. The memory portion 72 stores control programs and various information for performing the following controls. The hardware structure of the memory portion 72 is not limited, and a ROM, a RAM, etc., can be suitably used. The memory portion 72 includes a nonvolatile memory.

The throttle valve 41 is provided in the middle of an intake passage 17 of the engine 4. The changing of the opening degree of the throttle valve 41 causes the changing of the flow velocity and/or flow rate of the air to be supplied to the inside of the engine 4. When the flow velocity and/or the flow rate of the air to be supplied to the inside of the engine 4 increases, the rotation speed of the engine 4 increases, which in turn increases the driving force of the engine 4. The throttle control portion 71 receives a signal indicating the operation amount of the axel 43 from an axel sensor 52 described below, and controls the throttle valve 41 so that the opening degree of the throttle valve 41 matches the operation amount of the axel 43.

A fuel injector 42 is provided on the downstream side of the throttle valve 41 in the intake passage 17. The fuel injector 42 supplies the fuel stored in the fuel tank 2 to the inside of the engine 4. The fuel injector 42, in which the fuel injection amount is adjusted by the ECU 70, injects fuel into the intake passage 17. However, a vaporizer can be used instead of the fuel injector 42. The engine 4 burns the mixture of the fuel supplied from the fuel injector 42 and the air supplied from the intake passage 17. The exhaust gas generated by the engine 4 is discharged outside through the exhaust pipe 15.

To the throttle control portion 71, a throttle position sensor 51 is connected. The throttle position sensor 51 detects the opening degree of the throttle valve 41. Also, an axel sensor 52 is connected to the throttle control portion 71. The axel sensor 52 detects the operation amount of the axel 43 as its opening degree. In this embodiment, as shown in FIG. 5, the unit for the opening degree of the throttle valve 41 and for the opening degree of the axel 43 is degrees.

Figure 5:
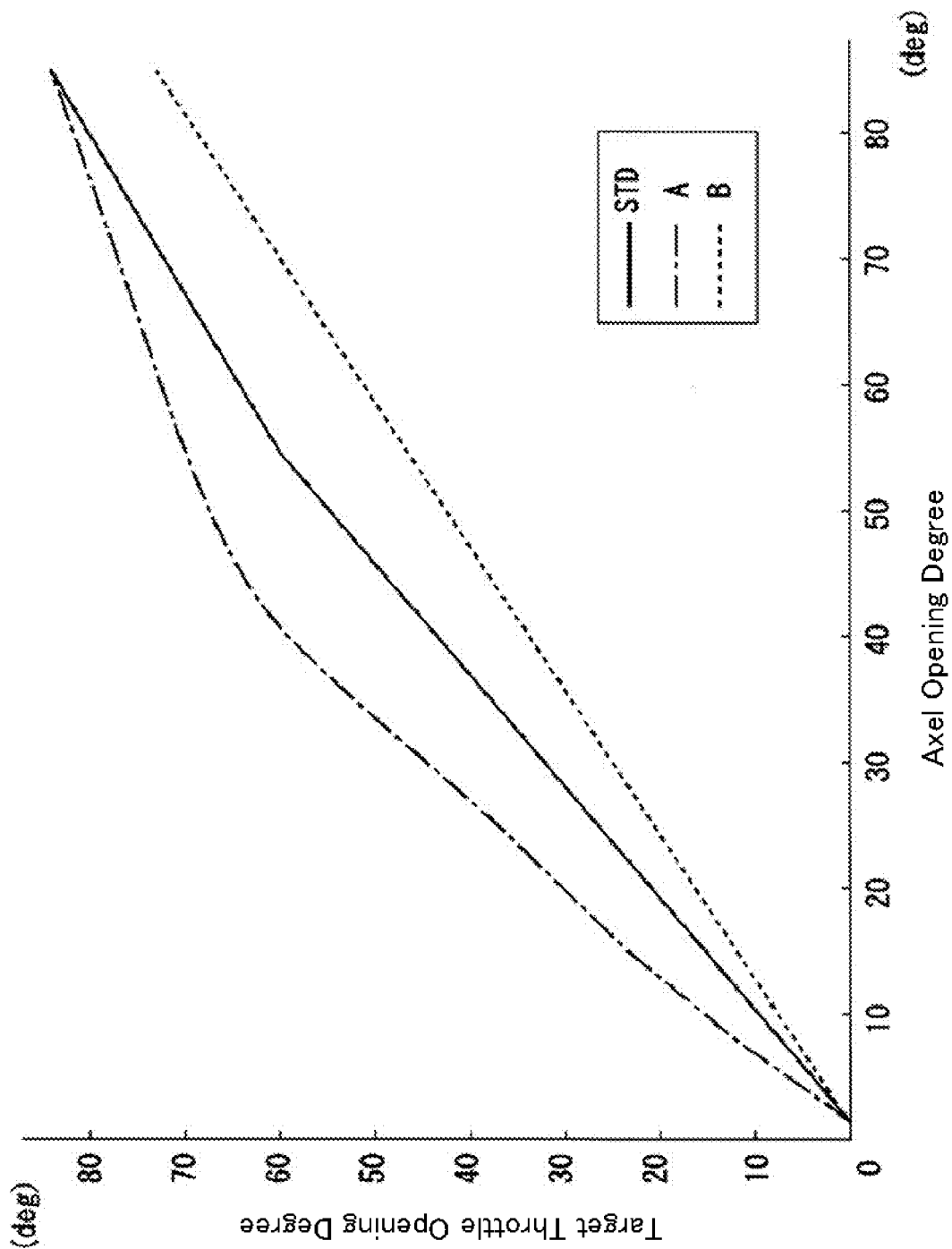
FIG. 5 is a graph showing a relationship between an axel opening degree and a targeted throttle opening degree in each control mode.

Information on a plurality of control modes is stored in the memory portion 72 of the throttle control device (see FIG. 5). In each control mode, the relationship between the opening degree of the axel 43 and the targeted opening degree of the throttle valve 41 is defined. In the memory portion 72, different targeted throttle opening degrees are stored corresponding to opening degrees of the axel 43, i.e., operation amounts of the axel 43. As described above, the memory portion 72 includes memories. The storage format of the aforementioned information in the memory is not specifically limited, and can be, for example, in a format of a map. It is enough that a plurality of targeted throttle opening degrees are set corresponding to each axel opening degree. In other words, it is sufficient that different targeted throttle opening degrees are set for each operation amount and one of the opening degrees can be selected as needed.

As shown in FIG. 5, in this embodiment, the throttle control device stores control mode information of three types. One of them is called a standard mode STD. The standard mode STD is set such that, for example, a stationary driving or a constant acceleration can be performed easy. Among three control modes, the two other types are called a mode A and a mode B. The mode A is set such that the targeted throttle opening degree becomes larger than that of the standard mode STD for the same operation amount of the axel 43. On the other hand, the mode B is set such that the targeted throttle opening degree becomes smaller than that of the standard mode STD for the same operation amount of the axel 43. The maximum opening degree of the throttle valve 41 exceeds 80 degrees. These control modes STD, A, and B are preliminarily converted into electronic data and stored in the memory portion 72 as maps. The reference numerals 81, 82, and 83 in FIG. 4 denote the maps of control modes STD, A, and B, respectively. The maps to be stored in the memory portion 72 as control mode information are not limited to maps of three types. They can be four types of maps or more, or two types of maps.

Figure 3:
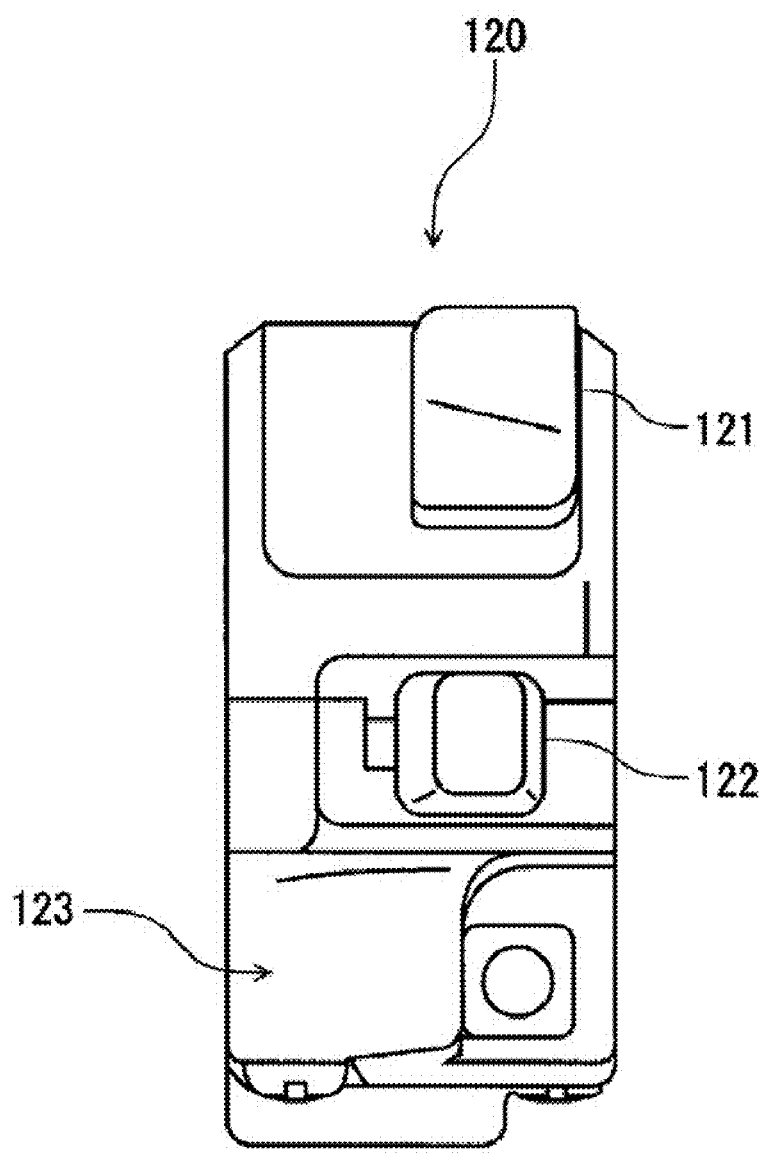
FIG. 3 is a front view of a switch panel of the motorcycle.

The changing of the control mode STD, A, and B is instructed by operating the change-over switch 122 (see FIG. 3). As described above, for example, in cases where the change-over switch 122 is a push button type switch, every time the change-over switch 122 is pressed once, the control mode changes from the standard mode STD to the mode A then to the mode B. If the current control mode is the mode B when the change-over switch 122 is operated, a change to the standard mode STD is instructed. In cases where the change-over switch 122 is a slide switch and, for example, when the change-over switch 122 is positioned in the center position in the right-and-left direction, the control mode becomes the standard mode STD. By sliding the change-over switch 122 to the left side, an instruction to change the mode to either the mode A or the mode B is given, and by sliding the change-over switch 122 to the right side, an instruction to change the mode to the other mode is given.

As shown in FIG. 4, the motorcycle 1 is equipped with a power supply device 21 and a main switch 22. When the main switch 22 is operated by a rider of the motorcycle 1, the power supply device 21 and the ECU 70 are electrically connected, which causes the ECU 70 to be operated. However, the motorcycle 1 is equipped with a relay switch or the like that is not shown in the drawings. Therefore, a portion of the ECU 70 can be operated even when the main switch 22 is not operated.

A mode selection portion 73 includes a judgment portion 73*a* and a changing portion 73*b*. In this embodiment, the changing of the control mode cannot be performed if predetermined conditions are not met. The predetermined conditions will be described later. The judgment portion 73*a* judges whether or not the aforementioned conditions are met. The changing portion 73*b* receives the judged result from the judgment portion 73*a* and performs the control mode change. A signal from the change-over switch 122 is inputted into the mode selection portion 73. This allows the mode selection portion 73 to detect that the change-over switch 122 is operated. Further, the mode selection portion 73 detects the opening degree of the throttle valve 41 by receiving a signal from the throttle position sensor 51, and also detects the opening degree of the axel 43 by receiving a signal from the axel sensor 52. The mode selection portion 73 outputs a changing signal 91 to the throttle control portion 71 after changing the control mode.

Meter Panel:

A meter panel 20 receives signals from the model selection portion 73 and displays the type of the current control mode.

Figure 6:
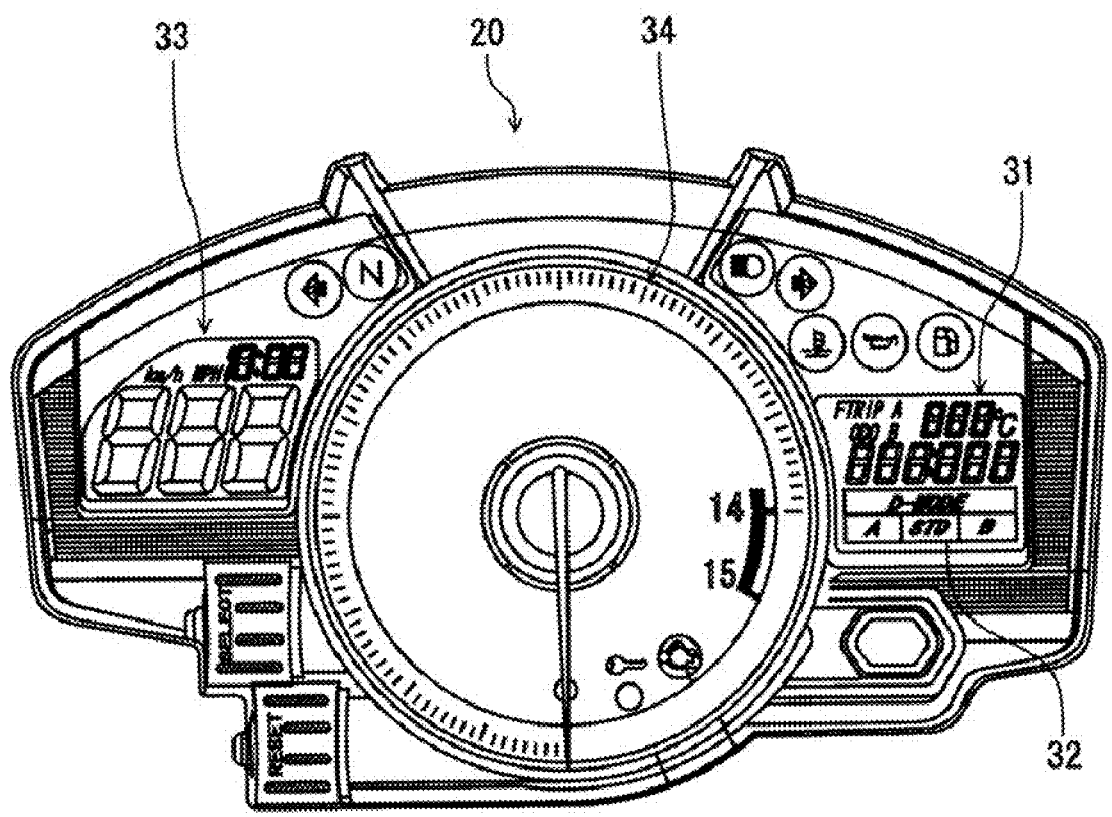
FIG. 6 is a front view of a meter panel.

As shown in FIG. 6, a mode display portion 32 is provided on the meter panel 20. The mode display portion 32 is formed on, for example, a liquid crystal panel. The mode display portion 32 has lighting portions corresponding to the type of control mode. In this embodiment, the mode display portion 32 has a lighting portion for the standard mode STD, a lighting portion of the mode A, and a lighting portion for the mode B. The type of the current control mode is displayed by lighting one of the lighting portions of the standard mode STD, the mode A, and the mode B. However, the type of the current control mode can be displayed on the liquid crystal panel 31. Also, it can be configured such that the mode display portion 32 has a single lighting portion. In this case, for example, the aforementioned lighting portion lights a lamp with one of different colors depending on each of the standard mode STD, the mode A, and the mode B.

The meter panel 20 is provided with a vehicle speed display portion 33 and a rotation speed display portion 34. The vehicle speed display portion 33 can display the vehicle speed of the motorcycle 1 detected by a vehicle speed sensor 54 (see FIG. 11). Also, the rotation speed display portion 34 can display the rotation speed of the engine 4 detected by an engine rotation speed sensor 53 (see FIG. 9).

Change of Control Mode:

Hereinafter, the control of changing the control mode performed by the throttle control device will be explained. In this embodiment, when the change-over switch 122 is operated in a state in which the opening degree of the axel 43 is equal to or less than the predetermined opening degree, the control mode change is executed.

Figure 7:
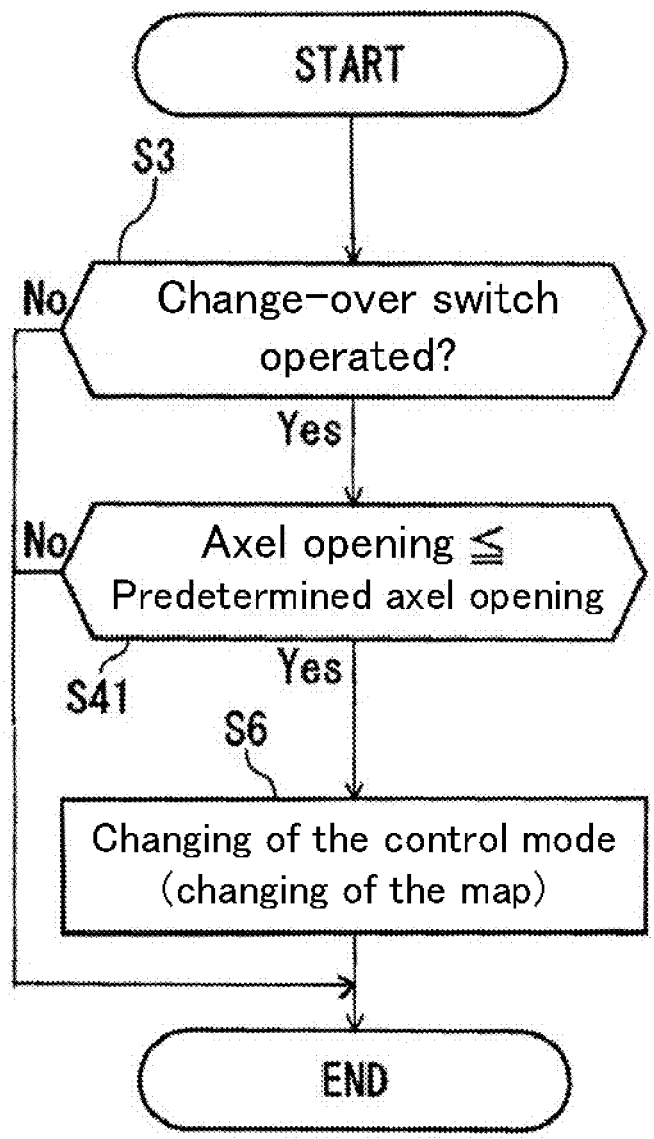
FIG. 7 is a flowchart of a mode change control according to Embodiment 1.

First, this control will be explained with reference to FIG. 7. First, at Step S3, it is judged by the judgment portion 73a whether or not the change-over switch 122 is operated. When the change-over switch 122 is operated, the routine proceeds to Step S41. At Step S41, it is judged by the judgment portion 73a whether or not the axel opening degree is equal to or smaller than the predetermined opening degree of the axel. If the opening degree of the axel is relatively larger, it is judged that it is inappropriate to perform the changing of the control mode and this control is terminated without making the change. On the other hand, if the opening degree of the axel is equal to or smaller than the predetermined axel opening degree, the routine proceeds to Step S6. At Step S6, the switching portion 73b performs the changing of the control mode.

Figure 8:
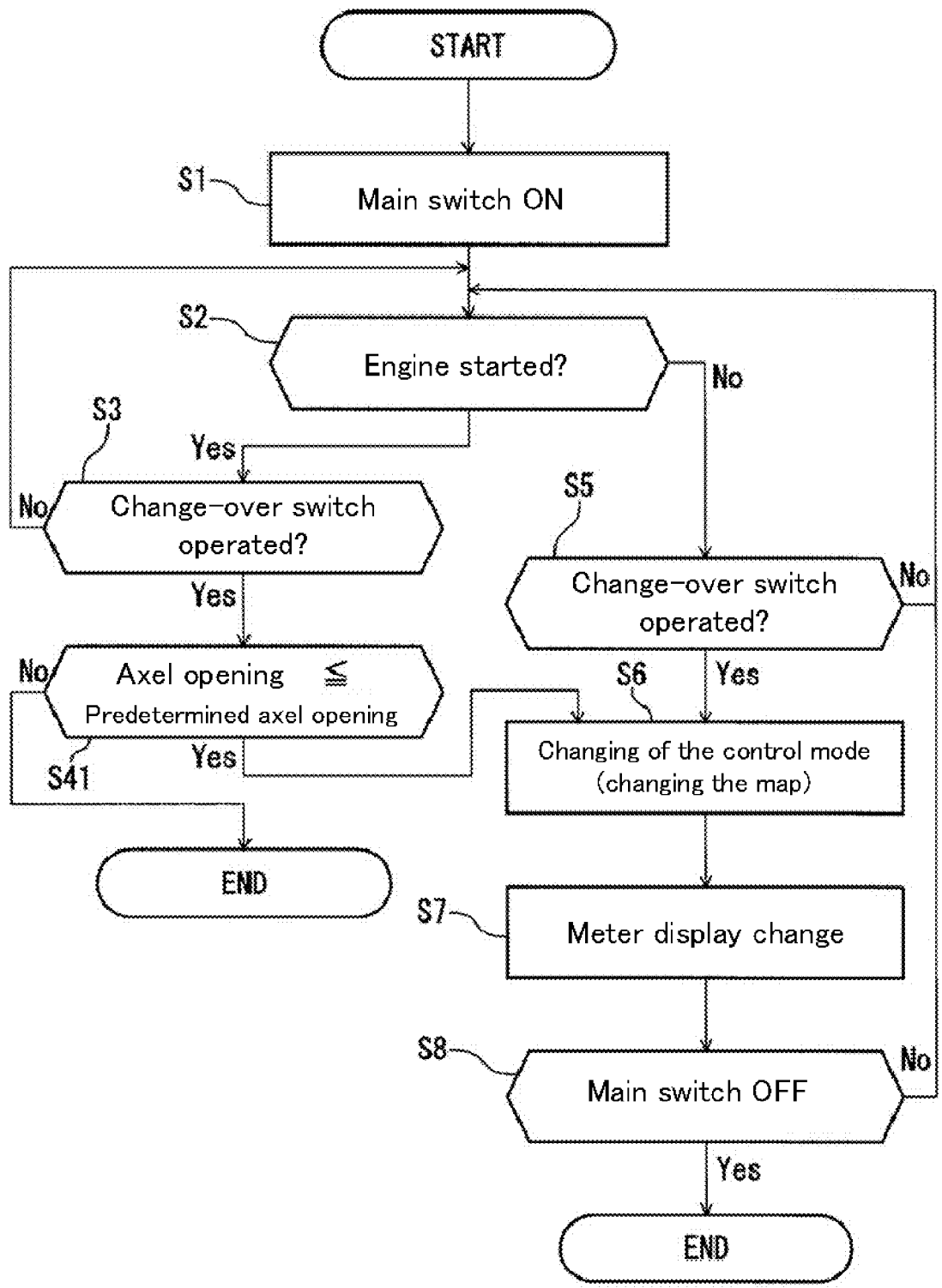
FIG. 8 is a flowchart of other mode change control according to Embodiment 1.

FIG. 8 is a flowchart showing other change control. In this control, at Step S1, the main switch 22 (see FIG. 4) is turned on, which allows at least the ECU 70 and the power supply device 21 to be turned on electrically.

At Step S2, after turning on the main switch 22, it is judged whether or not the engine 4 (see FIG. 4) is started. The engine 4 is started by, for example, operating a starter switch 123 as shown in FIG. 2. If the engine 4 is not started, the routine proceeds to Step S5. If the engine 4 is started, the routine proceeds to Step S3.

At Step S3, it is judged by the judgment portion 73a whether or not the change-over switch 122 is operated. If the change-over switch 122 is not operated, the control mode change is not performed and the routine returns to Step S2. If the change-over switch 122 is operated, the routine proceeds to Step S41.

At Step S41, it is judged whether or not the opening degree of the axel 43 (see FIG. 4) is equal to or less than the predetermined opening degree. In this embodiment, the operation amount of the axel 43 is the opening degree of the axel 43, but the operation amount of the axel 43 can be judged based on other physical quantities. For example, the aforementioned other physical quantity can be a length or the like in which "mm" (millimeter) is used as its unit. At Step S41, if the opening degree of the axel 43 is equal to or smaller than the predetermined opening degree, the routine proceeds to Step S6. If the opening degree of the axel 43 exceeds the predetermined opening degree, the control mode change is not performed. In this case, the operations of the change-over switch 122 are not accepted and cancelled. In other words, at Step S41, if the opening degree of the axel 43 exceeds the predetermined opening degree, the control mode change is not performed, and the control is terminated.

If the control mode change is performed when the opening degree of the axel 43 exceeds the predetermined opening degree, in a range where the opening degree of the throttle valve 41 is large, there is a possibility that a rider feels a sense of discomfort. For example, as shown in FIG. 5, when the axel opening degree is around 40 degrees, the targeted throttle opening degree of the standard mode STD and that of the mode A differ greatly. As a result, when the mode is changed from the standard mode STD to the mode A, the opening degree of the throttle valve 41 becomes larger, and therefore there is a possibility that the rider feels a sense of discomfort.

The aforementioned opening degree equal to or less than the predetermined opening degree denotes the opening degree of the axel 43 which is substantially zero. The case in which the opening degree of the axel 43 is substantially zero denotes the opening degree of the axel in which, for example, the motorcycle 1 can not be driven only with the driving force of the engine 4. In addition, the case in which the opening degree is equal to or less than the predetermined opening degree includes the case in which the opening degree of the axel 43 is zero. The case in which the opening degree of the axel 43 is zero refers to, for example, the case in which the engine is in an idling state or the like.

At Step S6, the switching portion 73b performs the control mode change. The control mode can be changed by changing three types of maps as mentioned above. When the control mode is changed, the display on the meter panel 20 is changed (Step S7). This control can be continuously performed until the main switch 22 is turned off (Step S8).

Furthermore, if it is judged at Step S2 that the engine 4 is not started, at Step S5, the judgment portion 73b judges whether or not the change-over switch 122 is operated. If the change-over switch 122 is operated, the routine proceeds to Step S6, and the aforementioned processing is executed. If the engine 4 is not started, the control mode is changed each time the change-over switch 122 is operated.

As described above, the memory portion 72 (see FIG. 4) includes a nonvolatile memory. The memory portion 72 can store the currently selected control mode. In other words, among the three types of aforementioned maps, the memory portion 72 stores the map that is being used to control the throttle valve 41 by the throttle control device 71. With this, even if the main switch 22 is turned off once at Step S8, when the main switch 22 is turned on next time, the mode selection portion 73 can extract the map that was being used before the main switch 22 was turned off. Therefore, even if the main switch 22 is turned off once, when the main switch 22 is turned on next time, the throttle control device 71 can read the map that was being used before the main switch 22 was turned off.

Functions and Effects:

As described above, in this embodiment, in changing the control mode, the opening degree difference between the targeted throttle opening degree in the current control mode and the targeted throttle opening degree in the control mode after the change is not calculated. With this, the throttle control device according to this embodiment can easily perform the processing such as calculations for changing the control mode.

Furthermore, in this embodiment, the control mode change is performed only when the change-over switch 122 is operated and that the opening degree of the axel 43 is equal to or smaller than the predetermined opening degree. Since the operation of the change-over switch 122 and that of the axel 43 are performed by a rider, these operations are clear for the rider. Therefore, the control mode change timing is clear to a rider.

Also, in this embodiment, the mode display portion 32 of the meter panel 20 has lighting portions corresponding to the type of the control mode. The type of the current control mode is displayed by lighting any one of the lighting portions among the lighting portions of the standard mode STD, mode A, and mode B. This allows a rider to easily view the type of the current control mode and the changing of the control mode. Therefore, the control mode change timing becomes clearer.

In this embodiment, the opening degree equal to or less than the predetermined opening degree denotes the opening degree of the axel 43 which is substantially zero. It is extremely clear to the rider whether or not the opening degree of the axel 43 is substantially zero. Therefore, the control mode change timing becomes clearer.

The throttle control device according to this embodiment has control mode information of three types, a standard mode STD, a mode A, and a mode B. The mode A is larger than the standard mode STD in targeted throttle opening degree and enables more rapid acceleration than in the standard mode STD. The mode B is smaller than the standard mode STD in targeted throttle opening degree, and enables more gradual acceleration than in the standard mode STD. The throttle control device according to this embodiment can provide a plurality of clearly different control modes.

According to this embodiment, the rider of the motorcycle 1 can easily operate the change-over switch 122 with, for example, the rider's right thumb. According to this embodiment, a rider can operate the change-over switch 122 while gripping the handle 12.

In addition, the right grip 12b of the handle 12 forms the axel 43. Therefore, it is not easy for the rider of the motorcycle 1 to simultaneously operate the axel 43 and the change-over switch 122. In the throttle control device according to this embodiment, however, the control mode change is performed only when the change-over switch 122 is operated in a state in which the opening degree of the axel 43 is equal to or smaller than the predetermined opening degree. Therefore, there is no need to simultaneously operate the axel 43 and the change-over switch 122. Furthermore, it is useless to operate the change-over switch 122 when the opening degree of the axel 43 exceeds the predetermined opening degree. According to this embodiment, such useless operation is unlikely to occur.

Modified Example 1

In the aforementioned embodiment, the opening degree of the axel 43 is used for the judgment of changing the control mode. The condition for the judgment, however, is not limited to the opening degree of the axel 43, and can be other conditions. This modified example makes a judgment based on the driving force transmitted to the rear wheel 10. The same reference numerals are allotted to the same structures as in the aforementioned embodiment, and the explanation will be omitted.

In this modified example, the mode selection portion 73 performs the control mode change when the change-over switch 122 is operated in a state in which the driving force transmitted to the rear wheel 10 is equal to or less than a predetermined value. The value of the driving force transmitted to the rear wheel 10 is estimated based on the rotation speed of the engine 4 detected by the engine rotation speed sensor 53 (see FIG. 9).

Figure 9:
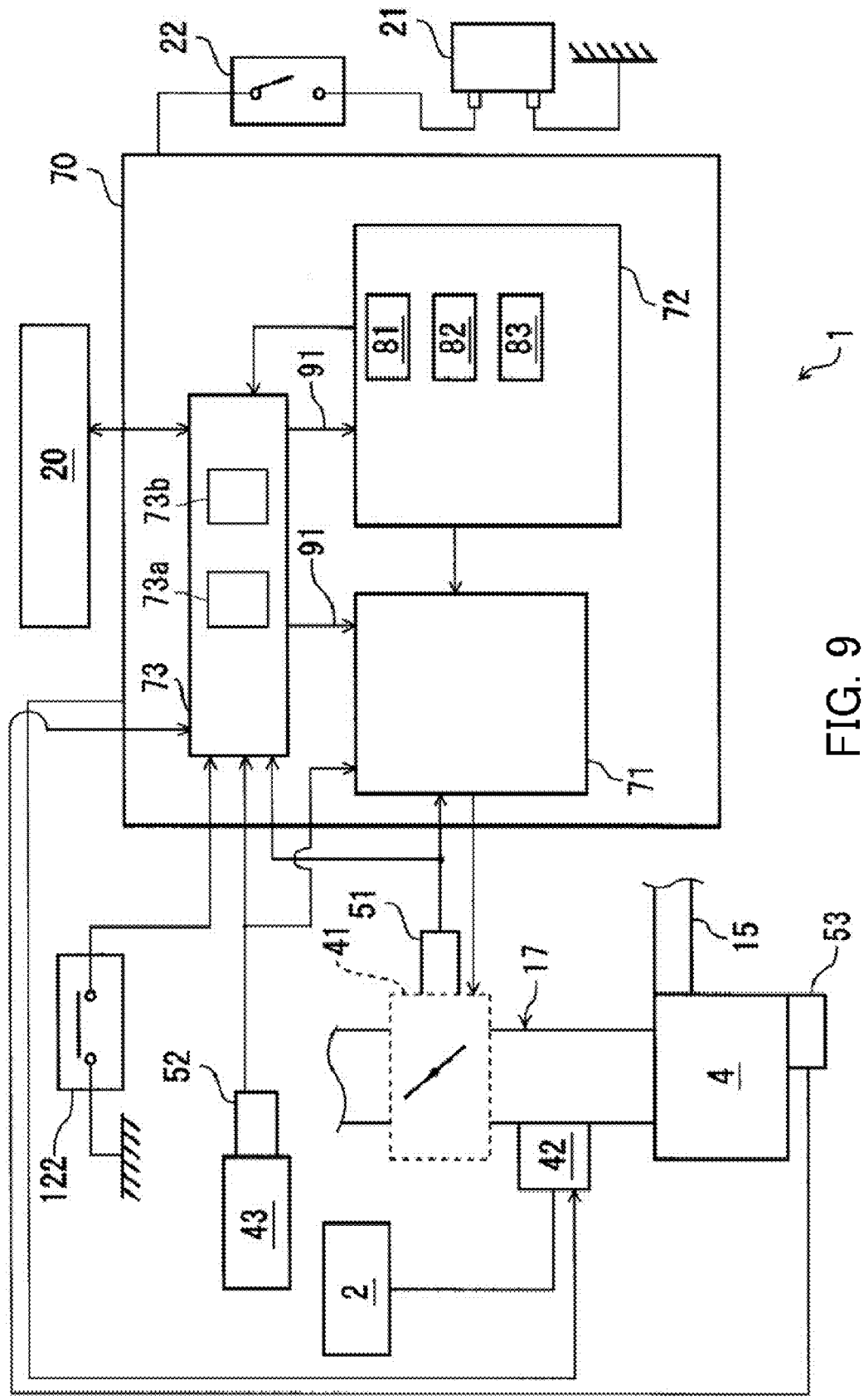
FIG. 9 is a structural view showing a throttle control device according to a modified example 1.

As shown in FIG. 9, the throttle control device according to this modified example is equipped with an engine rotation speed sensor 53. The engine rotation speed sensor 53 detects the rotation speed of the engine 4.

Figure 10:
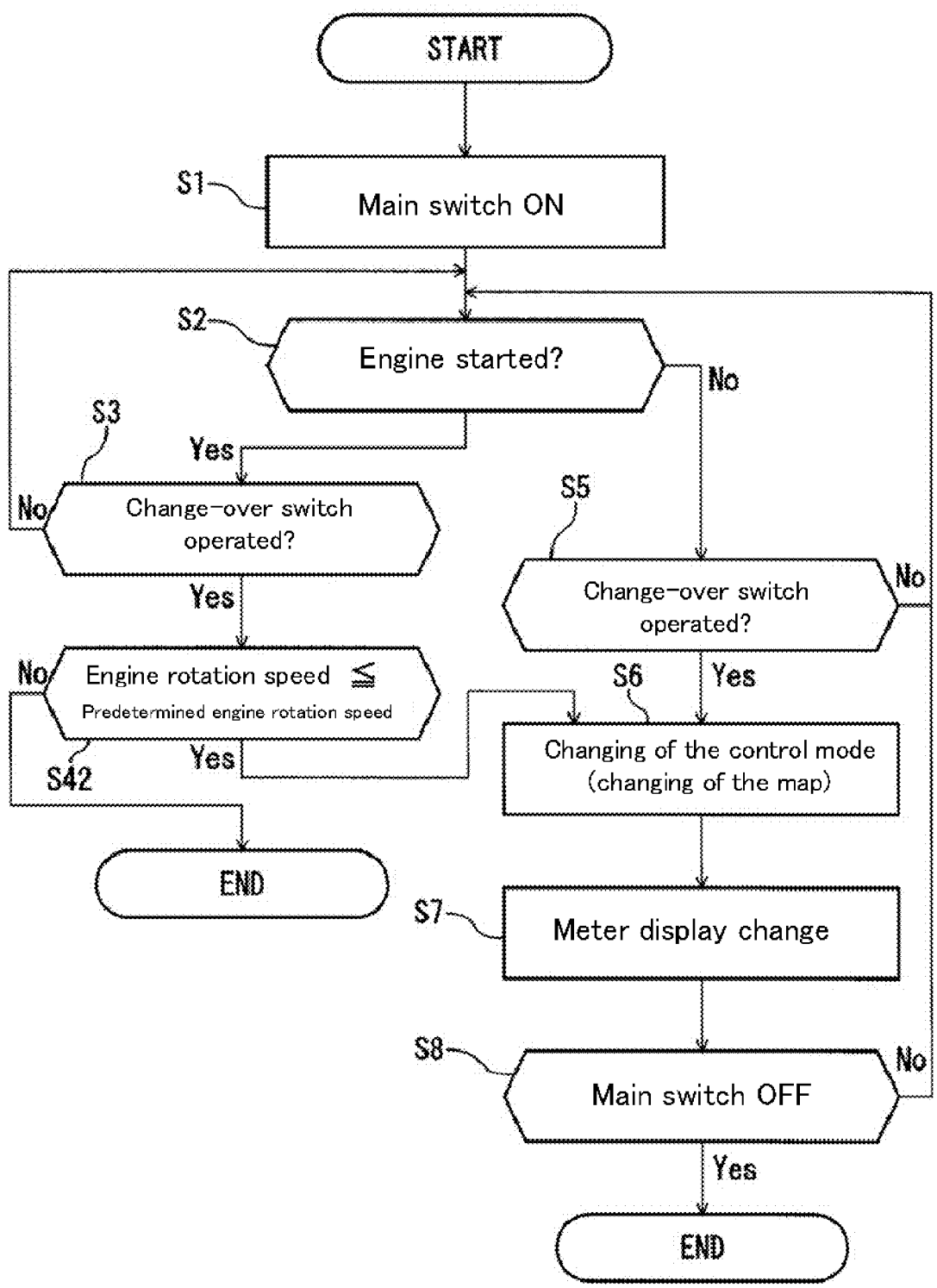
FIG. 10 is a flowchart of the mode change control according to the modified example 1.

Hereinafter, the control of the control mode change according to this modified example will be explained. FIG. 10 is a flowchart of the control of the control mode change. The same reference numerals are allotted to the same Steps as in the aforementioned embodiment, and the explanation will be omitted.

At Step S42, it is judged by the judgment portion 73a whether or not the rotation speed of the engine 4 (see FIG. 9) detected by the engine rotation speed sensor 53 is equal to or less than the predetermined rotation speed. When the rotation speed of the engine 4 is equal to or less than the predetermined rotation speed, the routine proceeds to Step S6. If the rotation speed of the engine 4 exceeds the predetermined rotation speed, the control mode change is not performed. In that case, the operation of the change-over switch 122 is not accepted and cancelled. In other words, at Step S42, if the rotation speed of the engine 4 exceeds the predetermined rotation speed, the control mode change is not performed and the control is terminated.

The rotation speed equal to or less than the predetermined rotation speed mentioned herein denotes, for example, a rotation speed of the engine 4 in which the motorcycle 1 cannot be driven with only the driving force of the engine 4. In other words, the rotation speed equal to or less than the predetermined rotation speed includes, for example, an idling state of the engine 4.

Also, in this modified example, in changing the control mode, the opening degree difference between the targeted throttle opening degree in the current control mode and the targeted throttle opening degree in the control mode after the change is not calculated. Also, in this modified example, the processing, such as, e.g., calculations for changing the control mode, can be performed easier.

The rotation speed of the engine 4 is displayed on the rotation speed display portion 34 of the meter panel 20. Therefore, the rotation speed of the engine 4 and the current control mode can be viewed simultaneously on the meter panel 20. Since the rider can easily view the rotation speed on the engine 4, the control mode change timing becomes clear.

Modified Example 2

In this modified example, the driving force transmitted to the rear wheel 10 is estimated based on the vehicle speed of the motorcycle 1. In this modified example, in changing the control mode, the judgment is performed based on the vehicle speed of the motorcycle 1. The same reference numerals are allotted to the same structures and Steps in the aforementioned Embodiment 1 and the modified example 1, and the explanation will be omitted.

Figure 11:
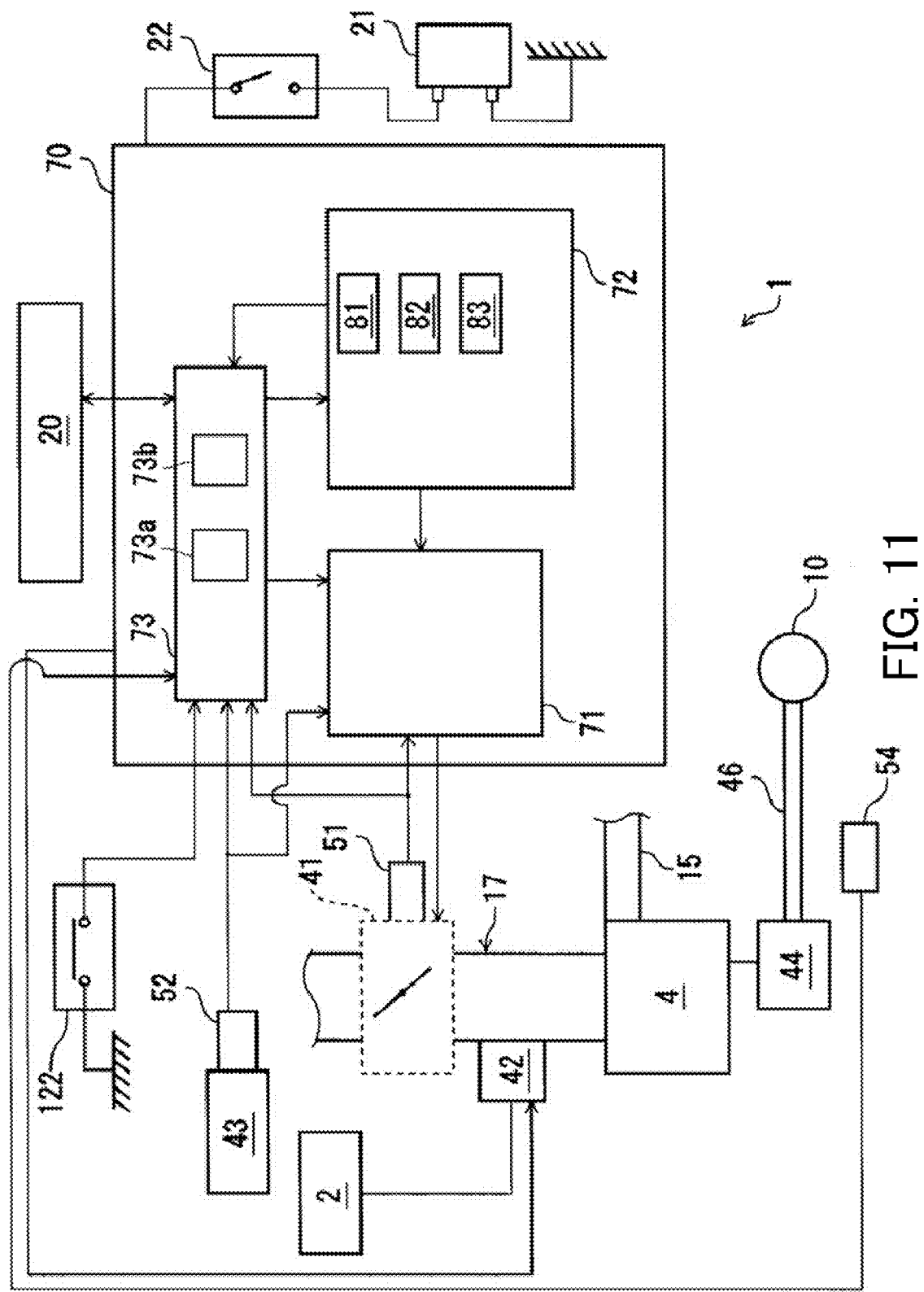
FIG. 11 is a structural view showing a throttle control device according to a modified example 2.

As shown in FIG. 11, the motorcycle 1 is equipped with a transmission 44. The engine 4 is connected to the transmission 44. The motorcycle 1 can include a clutch (not shown) configured to transmit the driving force between the engine 4 and the rear wheel 10 in an engageable and disengageable manner. The driving force of the engine 4 is transmitted to the rear wheel 10 via at least the transmission 44 and the power transmission mechanism 46.

The motorcycle 1 is equipped with a vehicle speed sensor 54. The vehicle speed sensor 54 detects the vehicle speed of the motorcycle 1. The attachment position of the vehicle speed sensor 54 is not specifically limited. It is sufficient that the vehicle speed sensor 54 can detect the vehicle speed of the motorcycle 1. However, the motorcycle 1 can be equipped with something to calculate the vehicle speed of the motorcycle 1 instead of the vehicle speed sensor 54.

Figure 12:
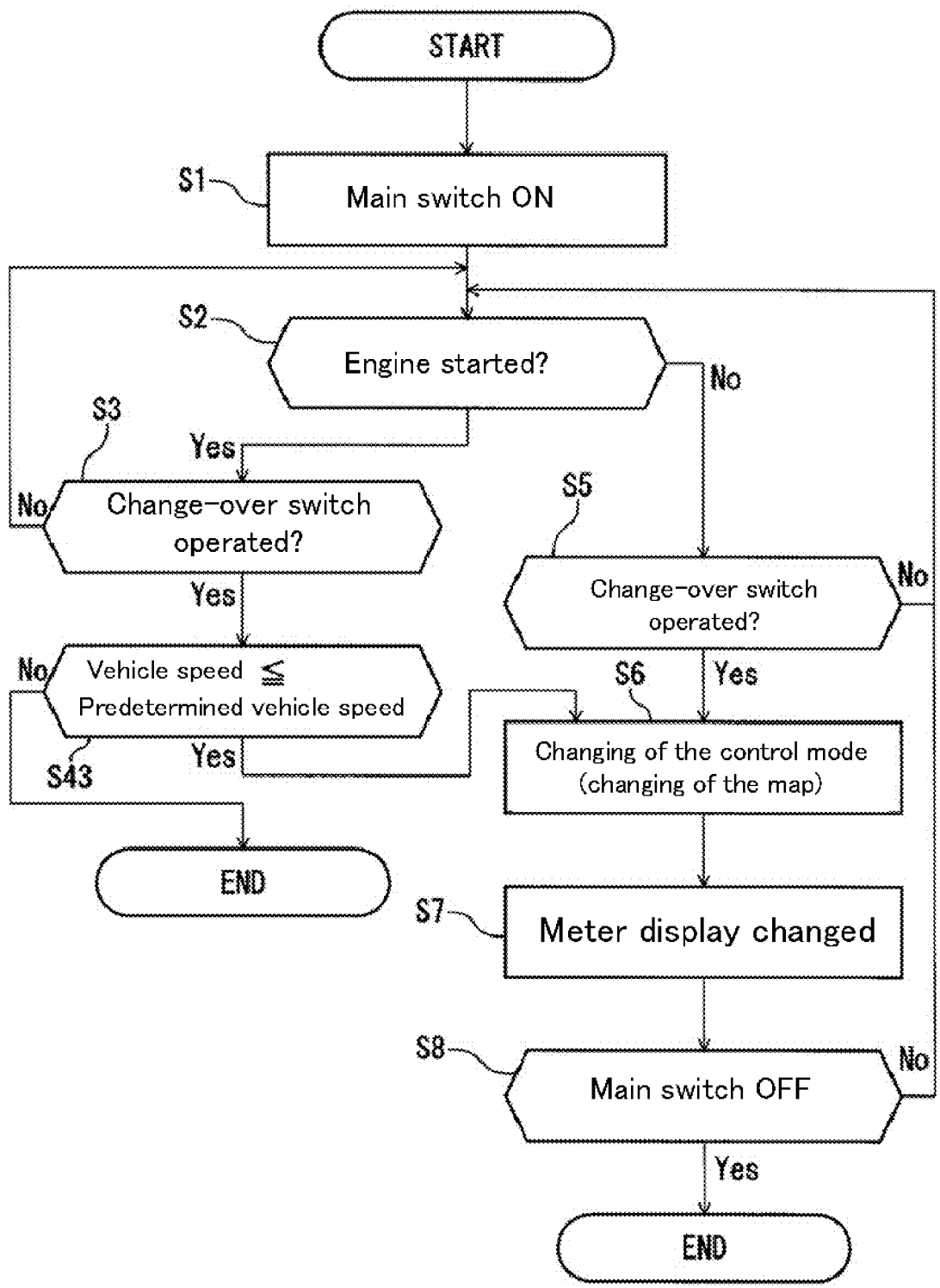
FIG. 12 is a flowchart of a mode change control according to the modified example 2.

Hereinafter, the control of changing the control mode in this modified example will be explained. FIG. 12 is a flowchart showing the control in this modified example.

At Step S43, it is judged by the judgment portion 73a whether or not the vehicle speed of the motorcycle 1 (see FIG. 1) detected by the vehicle sensor 54 is equal to or less than the predetermined vehicle speed. If the vehicle speed of the motorcycle 1 is equal to or less than the predetermined vehicle speed, the routine proceeds to Step S6. At Step S43, if the vehicle speed of the motorcycle 1 exceeds the predetermined vehicle speed, the control mode change is not performed. In this case, the operation of the change-over switch 122 is not accepted and cancelled. In other words, at Step S43, if the vehicle speed of the motorcycle 1 exceeds the predetermined vehicle speed, the control mode change is not performed and the control is terminated.

The vehicle speed equal to or less than the predetermined vehicle speed mentioned here includes, for example, an idling state of the motorcycle 1. The idling state of the motorcycle 1 denotes a state in which the vehicle speed of the motorcycle 1 is zero.

Also in this modified example, in performing the control mode change, the opening degree difference between the opening degree of the targeted throttle opening degree in the current control mode and the targeted throttle opening degree in the control mode after the change is not calculated. Also, in this modified example, the processing, such as, e.g., the calculation for the changing of the control mode, is easy.

The vehicle speed of the motorcycle 1 is displayed on the vehicle speed display portion 33 of the meter panel 20. Therefore, a rider can simultaneously view the vehicle speed of the motorcycle 1 and the current control mode on the meter panel 20. Since a rider can easily view the vehicle speed of the motorcycle 1, the control mode change timing becomes clear.

Modified Example 3

In this modified example, the driving force transmitted to the rear wheel 10 is estimated based on the gear position of the transmission 44. In this modified example, in performing the control mode change, a judgment is performed based on the gear position of the transmission 44. As to the same structure and step, the same reference numeral is allotted to the corresponding structure and step in the aforementioned Embodiment 1 and the modified examples, and the explanation will be omitted.

Figure 13:
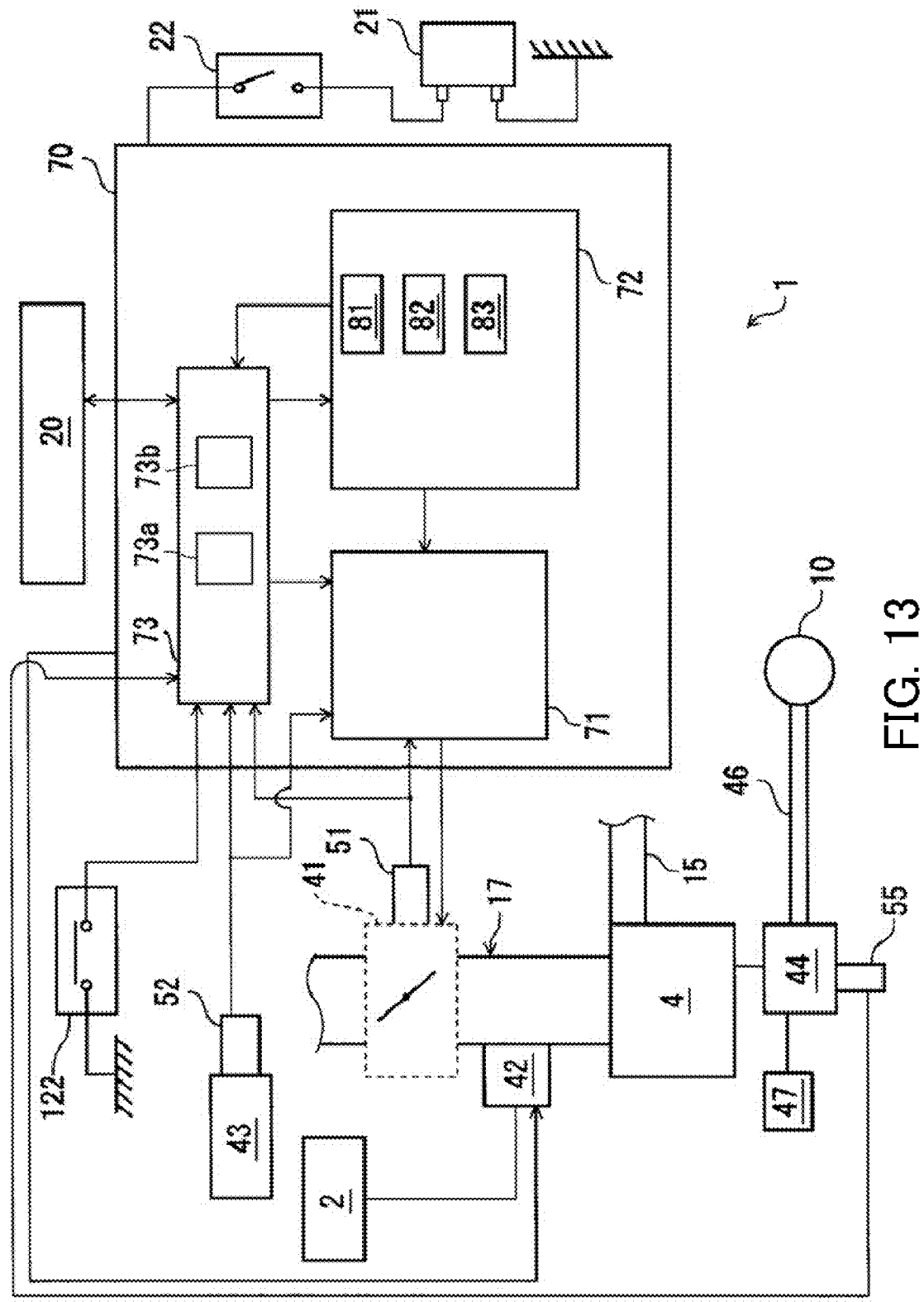
FIG. 13 is a structural view showing a throttle control device according to a modified example 3.

As shown in FIG. 13, the motorcycle 1 is equipped with a transmission 44. The engine 4 is connected to the transmission 44. The transmission 44 has a neutral position and a plurality of gear positions. The transmission 44 is connected to a shifting operator 47. When the rider of the motorcycle 1 operates the shifting operator 47, the gear position of the transmission 44 is changed. The motorcycle 1 can be equipped with a clutch (not shown) that transmits the driving force between the engine 4 and the rear wheel 10 in an engageable and disengageable manner. The driving force of the engine 4 is transmitted to the rear wheel 10 via at least the transmission 44 and the power transmission mechanism 46.

The motorcycle 1 is equipped with a shift sensor 55. The shift sensor 55 detects the gear position of the transmission 44.

Figure 14:
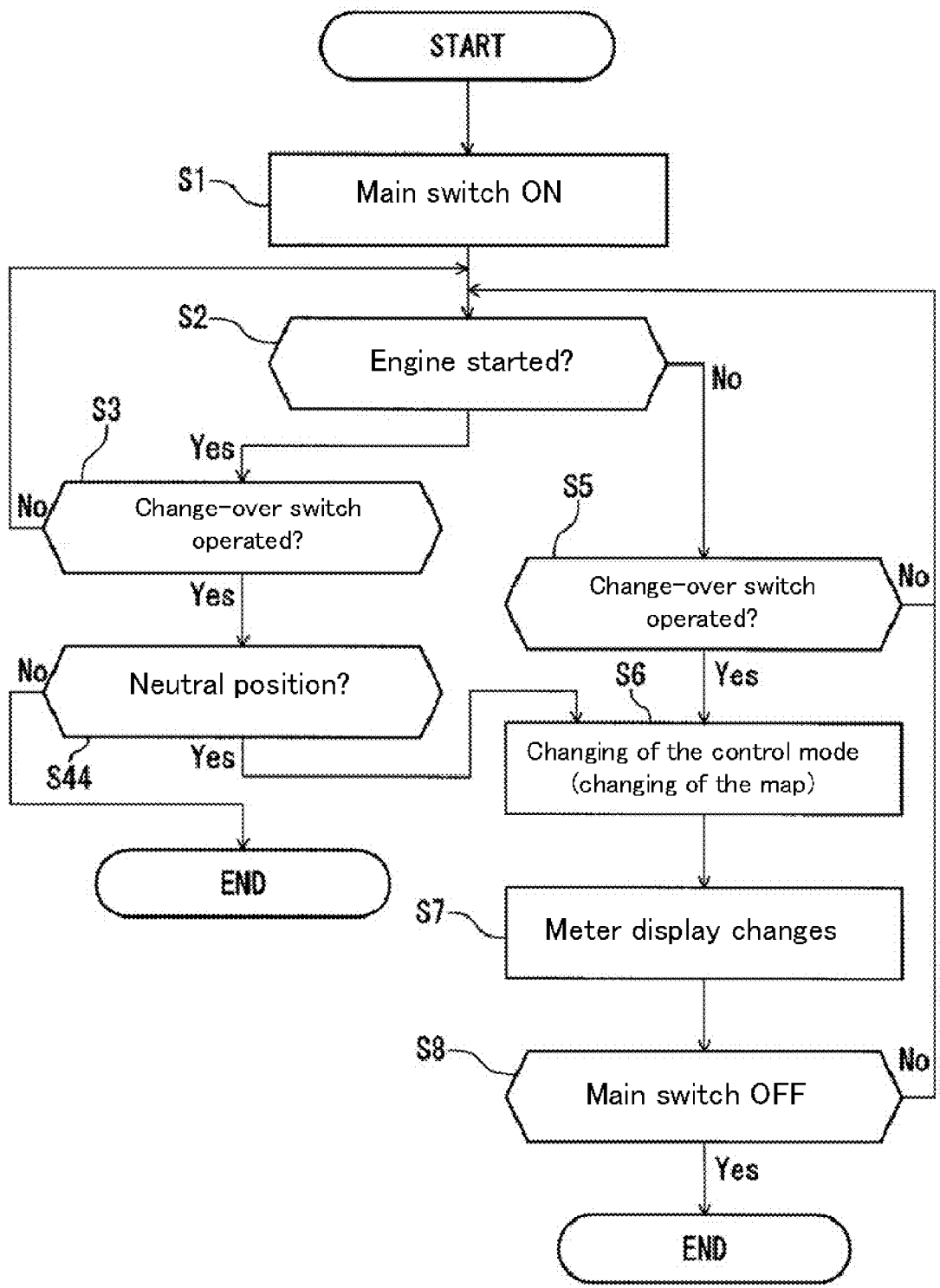
FIG. 14 is a flowchart of the mode change control according to the modified example 3.

Hereinafter, the control of changing the control mode in this modified example will be explained. FIG. 14 is a flow-chart showing the control in this modified example.

At Step S44, it is judged by the judgment portion 73a whether or not the gear position of the transmission 44 (see FIG. 13) detected by the shift sensor 55 is in a neutral position. If the gear position of the transmission 44 is in a neutral position, the routine proceeds to Step S6. If the gear position of the transmission 44 is in a neutral position, the driving force of the engine 4 is not transmitted up to the rear wheel 10, and the motorcycle 1 is unable to be driven by the driving force of the engine 4. At Step S44, if the gear position of the transmission 44 is not in a neutral position, the control mode change is not performed. In this case, the operation of the change-over switch 122 is not accepted and cancelled. In other words, at Step S44, if the gear position of the transmission 44 is not in a neutral position, the control mode change is not performed and the control is terminated.

Also, in this modified example, in performing the control mode change, the opening degree difference between the targeted throttle opening degree in the current control mode and the targeted throttle opening degree in the control mode after the change is not calculated. Also, in this modified example, the processing, such as, e.g., the calculation for changing the control mode, is easy.

Furthermore, in the throttle control device of this modified example, the control mode change is performed only when the change-over switch 122 is operated in a state in which the gear position of the transmission 44 is in a neutral position. Therefore, the control mode change timing is clear.

Modified Example 4

In this modified example, the driving force transmitted to the rear wheel 10 is estimated based on the connection status of the clutch 45. In this modified example, in performing the control mode change, it is judged whether or not the clutch 45 is in an engaged status. As to the same structure and Step, the same reference numeral is allotted to the corresponding portion in the aforementioned Embodiment 1 and modified examples, and the explanation will be omitted.

Figure 15:
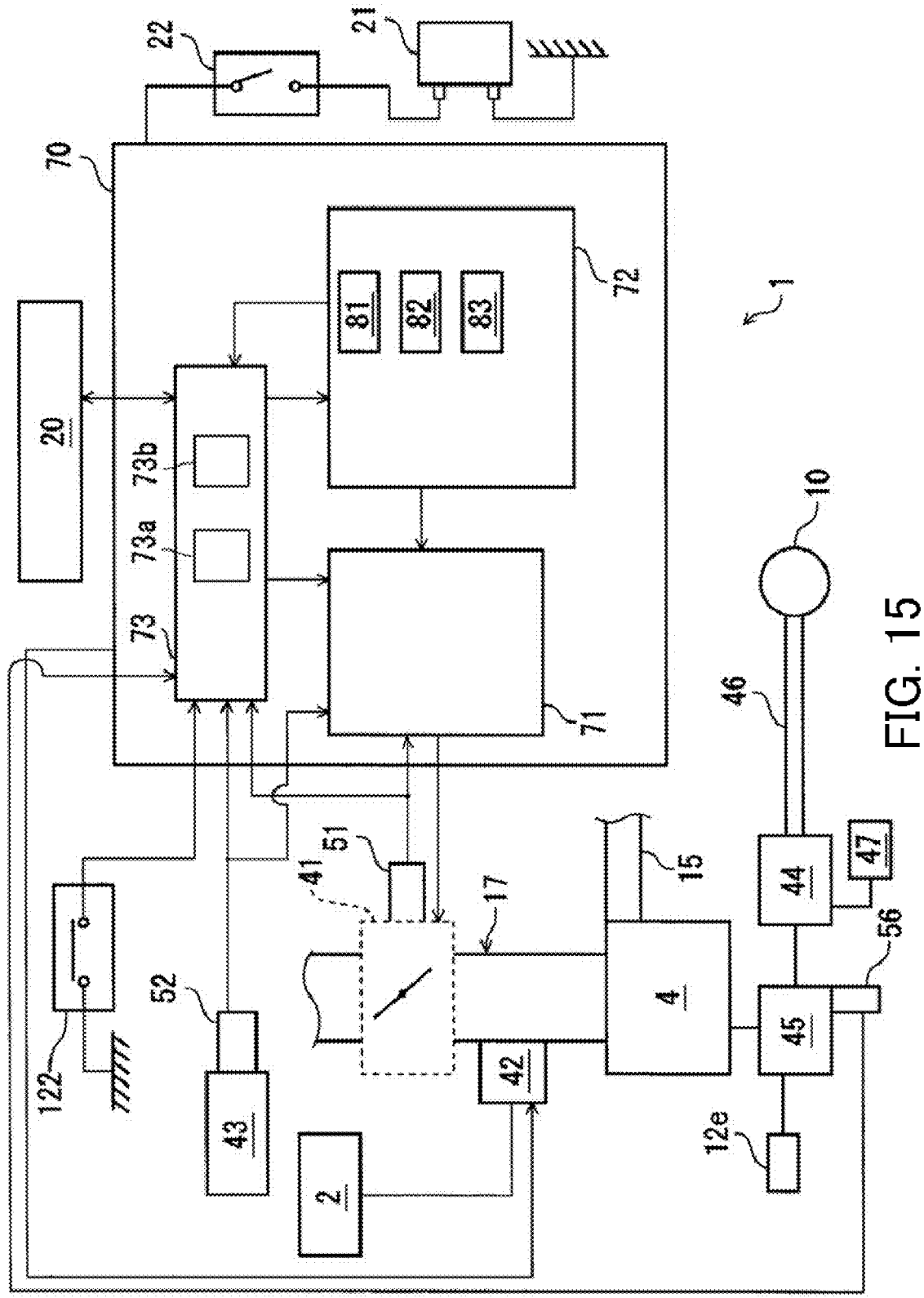
FIG. 15 is a structural view showing a throttle control device according to a modified example 4.

As shown in FIG. 15, the motorcycle 1 is equipped with a transmission 44 and a clutch 45. The engine 4 is connected to the transmission 44 via the clutch 45. The clutch 45 connects and disconnects the transmission of the driving force between the engine 4 and the rear wheel 10. The clutch 45 is connected to the clutch operator. As the clutch operator, for example, the left lever 12e shown in FIG. 2 can be used. The driving force of the engine 4 is transmitted to the rear wheel 10 via at least the clutch 45, the transmission 44, and the power transmission mechanism 46.

The motorcycle 1 is equipped with a clutch sensor 56. The clutch sensor 56 detects the engaged status or disengaged status of the clutch 45. When the clutch 45 is in a disengaged status, the driving force of the engine 4 is not transmitted to the rear wheel 10. On the other hand, if the clutch 45 is in an engaged status, the driving force of the engine can be transmitted to the rear wheel 10.

Figure 16:
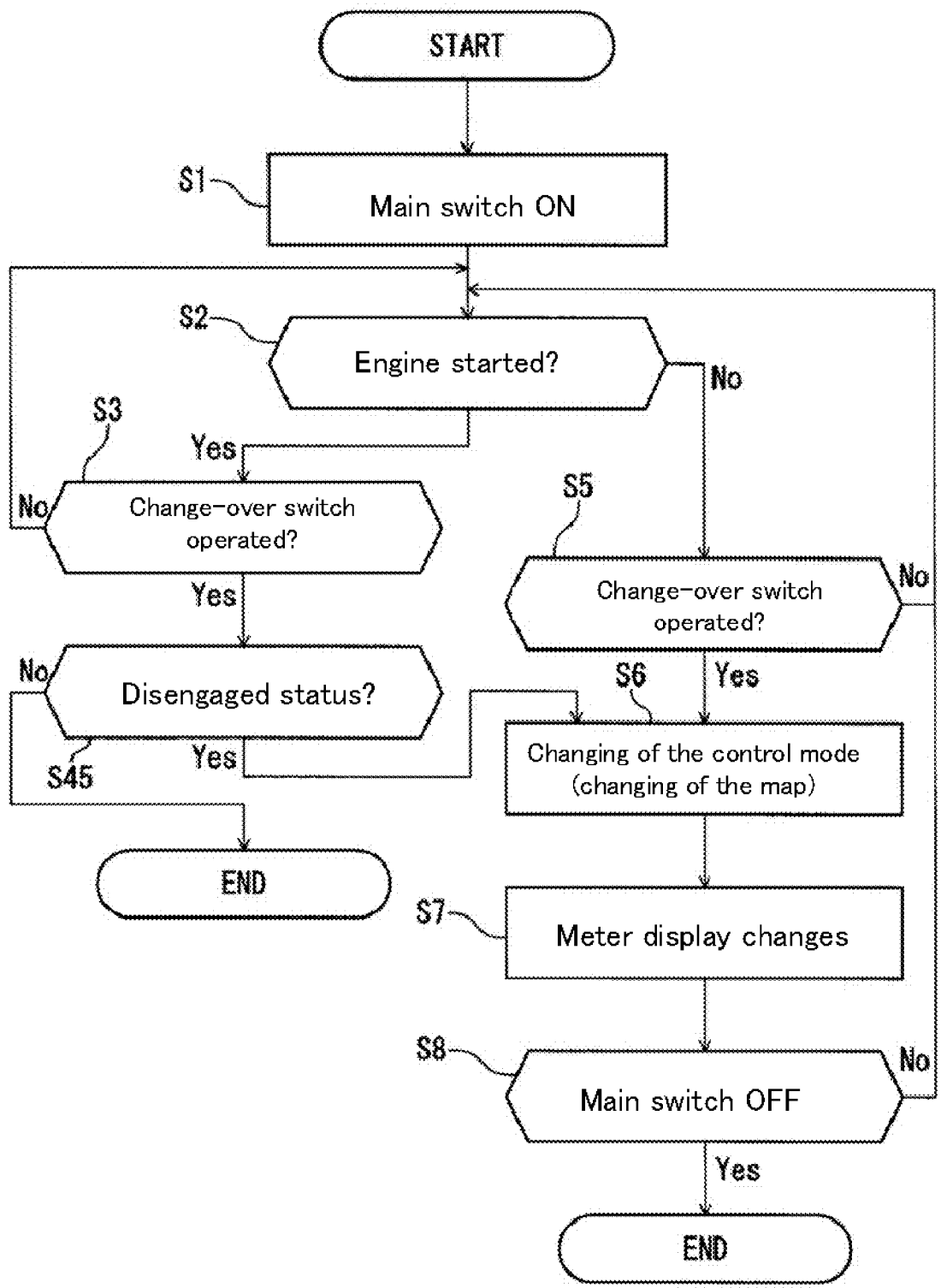
FIG. 16 is a flowchart of a mode change control according to the modified example 4.

Hereinafter, the control for changing the control mode in this modified example will be explained. FIG. 16 is a flow-chart showing the control in this modified example.

At Step S45, it is judged by the judgment portion 73a whether or not the status of the clutch 45 (see FIG. 15) detected by the clutch sensor 56 is in a disengaged status. If the clutch 45 is in a disengaged status, that is, when the clutch 45 is not in an engaged status, the routine proceeds to Step S6. At Step S45, if the clutch 45 is not in a disengaged status, that is, if the clutch 45 is in an engaged status, the control mode change is not performed. In this case, the operation of the change-over switch 122 is not accepted and cancelled. That is, at Step S45, if the clutch 45 is not in a disengaged status, the control mode change is not performed and the control is terminated.

Also in this modified example, the opening degree difference between the targeted throttle opening degree in the current control mode and the targeted throttle opening degree in the control mode after the change is not calculated. Also in this modified example, the processing, such as, e.g., the calculation for changing the control mode is, easy.

Furthermore, in the throttle control device of this modified example, the control mode change is performed only when the change-over switch 122 is operated in a state in which the clutch 45 is in a disengaged status. Therefore, the control mode change timing is clear.

Embodiment 2

In the aforementioned Embodiment 1 and in each of the modified examples, in cases where the required judgment conditions for changing the control mode are not met, the operation of the change-over switch 122 is not accepted and cancelled once. In this embodiment, in cases where the aforementioned judgment conditions are not met when the change-over switch 122 is operated, the processing waits until the judgment conditions are met and the control mode change is performed after the conditions are met.

Figure 17:
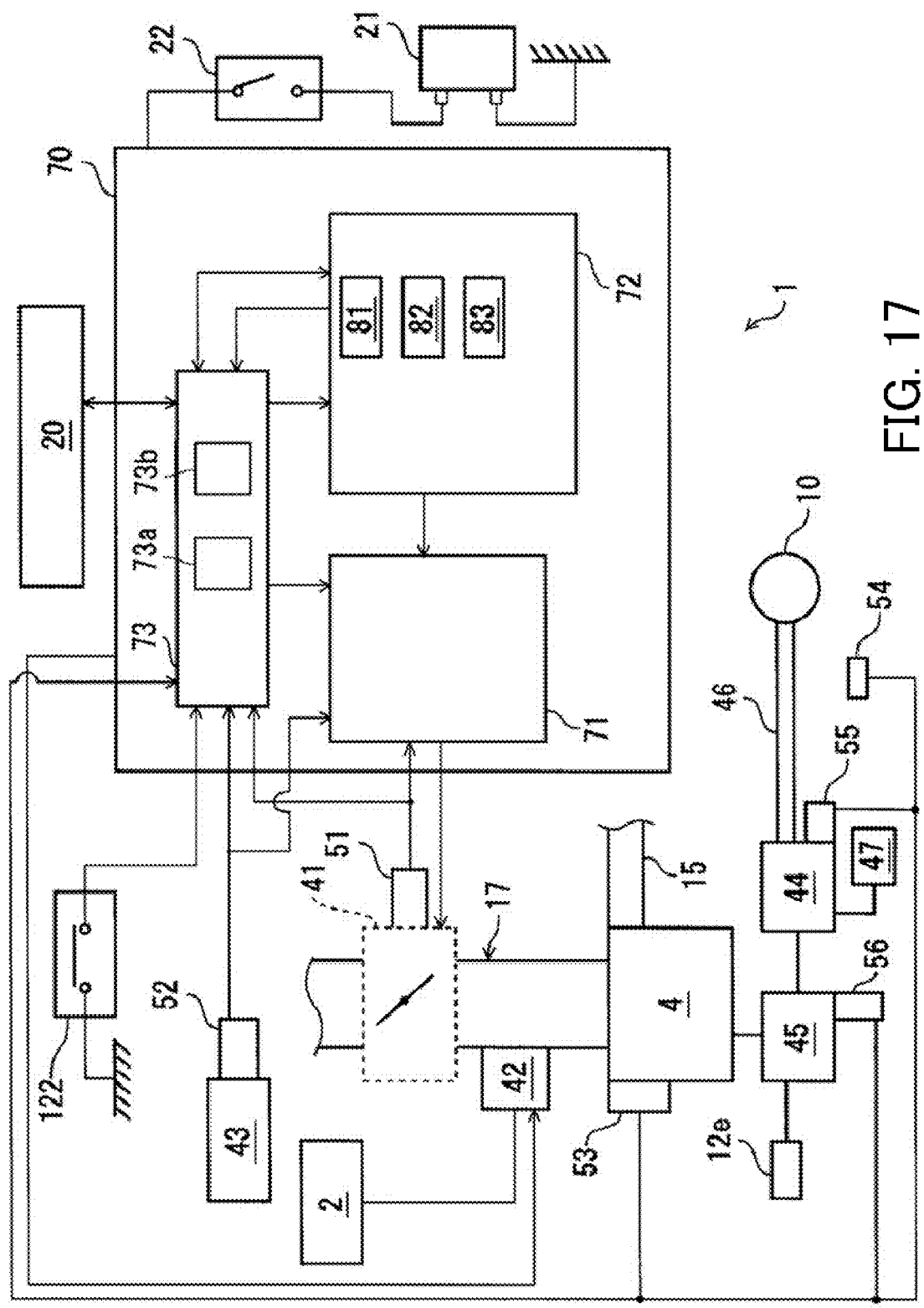
FIG. 17 is a structural view showing the throttle control device according to Embodiments 2 and 3.

A throttle control device and a motorcycle 1 according to this embodiment is shown in FIG. 17. In the following explanation, as to the same structures and Steps in the aforementioned Embodiment 1 and in each of the modified examples, the same reference numerals are allotted to the corresponding portions, and duplicative explanations will be omitted.

Figure 18:
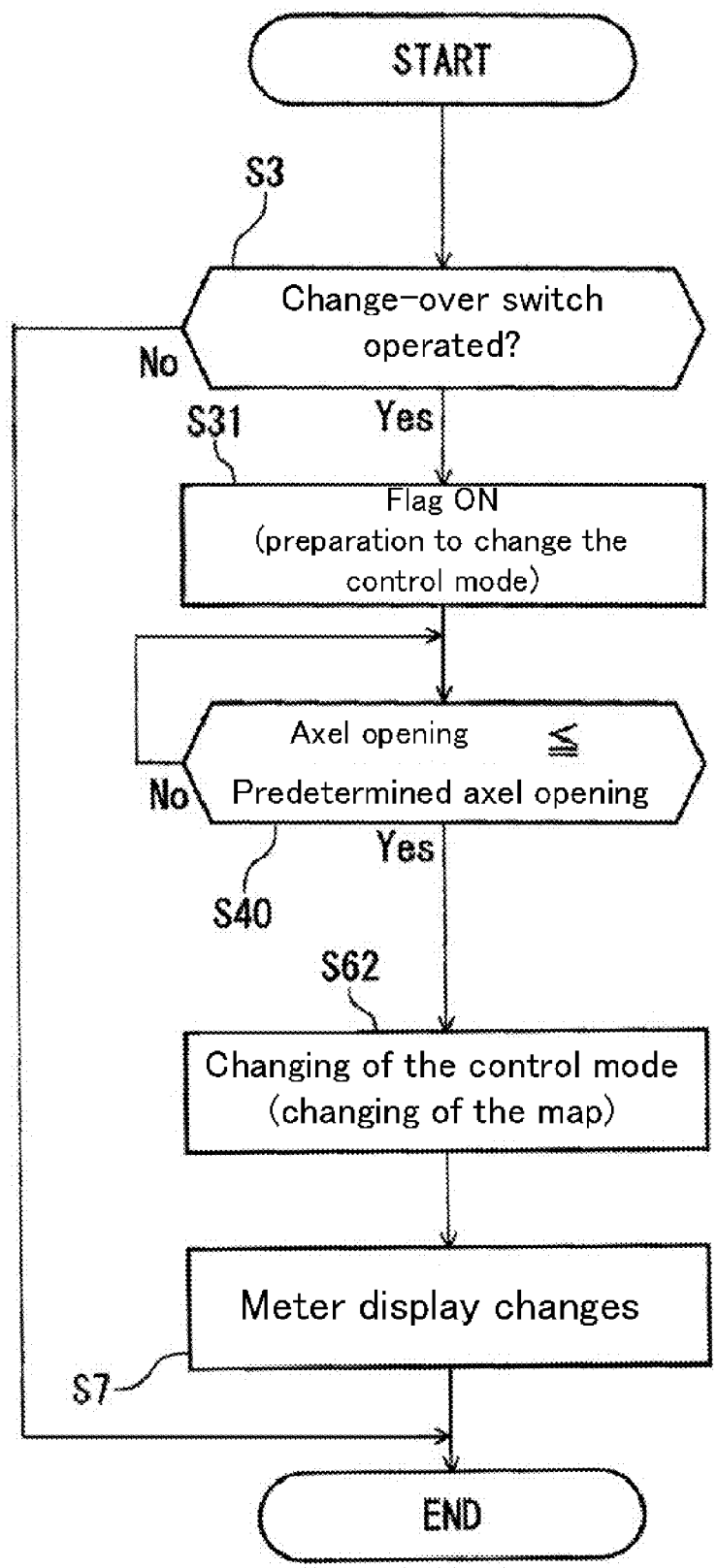
FIG. 18 is a flowchart of the mode change control according to Embodiment 2.

FIG. 18 is a flowchart showing the control for changing the control mode according to this embodiment. At Step S3, it is judged by the judgment portion 73a whether or not the change-over switch 122 is operated. If the change-over switch 122 is operated, the routine proceeds to S31, and the memory portion 72 stores that the change-over switch 122 is operated. Specifically, a flag for preparing the control mode change is turned on. Next, the routine proceeds to Step S40, and the judgment portion 73a performs a predetermined judgment. The judgment conditions for Step S40 are not specifically limited, and any judgment conditions in the aforementioned Embodiment and its modified examples can be used. The judgment condition herein is whether or not the axel opening degree is equal to or less than a predetermined axel opening degree. If the judgment result at Step S40 is "Yes," the routine proceeds to S62. At Step S62, the switching portion 73b performs the control mode change. At this time, the aforementioned flag is turned off. In other words, in the memory portion 72, the memory that the change-over switch 122 is operated is deleted. At Step S7, the display of the meter panel 20 is changed, and the control mode after the change is displayed.

Figure 19:
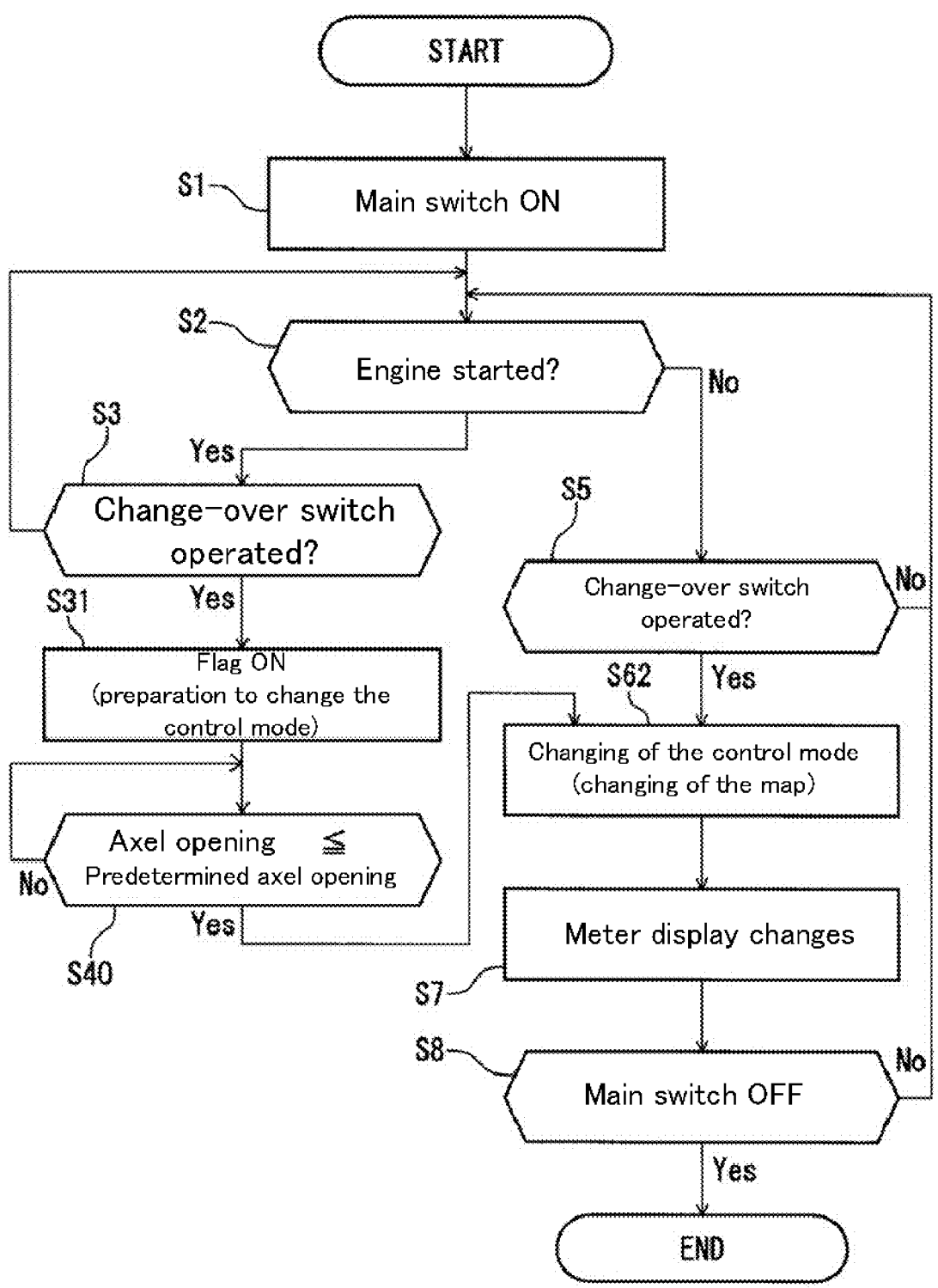
FIG. 19 is a flowchart of another mode change control according to Embodiment 2.

FIG. 19 is a flowchart showing other changing control. At Step S3, it is judged by the judgment portion 73a whether or not the change-over switch 122 is operated. If the change-over switch 122 is not operated, the control mode change is not performed. If the change-over switch 122 is operated, the routine proceeds to Step S31.

At Step S31, in the mode selection portion 73, the flag for preparing the control mode change is turned on. When the flag is turned on, at Step S40, it is judged by the judgment portion 73a whether or not predetermined judgment conditions are met.

At Step S40, it is judged whether or not, for example, the opening degree of the axel 43 (see FIG. 17) is equal to or smaller than a predetermined opening degree. However, as described in each of the modified examples of the aforementioned embodiment, at Step S40, other judgment conditions can be used. For example, at Step S40, the engine rotation speed can be used as a judgment condition. Furthermore, at Step S40, the vehicle speed of the motorcycle 1, the gear position of the transmission 44, or the connection status of the clutch 45 can be used as judgment conditions.

At Step S40, when the predetermined judgment conditions are met, the routine proceeds to Step S62. When the predetermined judgment conditions are not met, Step S40 is repeated.

At Step S62, the switching portion 73b performs the control mode change. Furthermore, at Step S62, the flag that was turned on at Step S31 is turned off. Also in this embodiment, when the control mode is changed, the display on the meter panel 20 is changed (Step S7).

As described above, in this embodiment, in cases where the change-over switch 122 is operated in a state in which the opening degree of the axel 43 exceeds a predetermined opening degree, the memory portion 72 stores that the change-over switch 122 is operated until the opening degree becomes the predetermined opening degree. When the opening degree of the axel 43 becomes equal to or smaller than the predetermined opening degree, the control mode change is performed. Therefore, even if the rider operates the change-over switch 122 when the opening degree of the axel 43 exceeds the predetermined opening degree, the control mode change can be performed only by operating the axel 43 afterwards so that the opening degree of the axel becomes equal to or smaller than the predetermined opening degree. Therefore, it is not required to operate the change-over switch 122 again.

Embodiment 3

In Embodiment 3, the on-state of the flag is displayed on the meter panel 20 during that the flag is in a turned-on state in the aforementioned Embodiment 2. In the following explanation, the same reference numerals are allotted to the same structures and Steps as in the aforementioned Embodiments and in each of the modified examples, and duplicative explanations will be omitted.

In this meter panel 20 according to this embodiment, it is configured such that each of the lighting portions of the mode display portion 32 shown in FIG. 6 for showing the standard mode STD, the mode A, and the mode B can be not only lighted or but also blinked. As described above, the type of the current control mode is displayed by lighting the lighting portion. As described later, in cases where the predetermined conditions are not met when the change-over switch 122 is operated, the lighting portion corresponding to the current control mode before the change is turned off and the lighting portion corresponding to the control mode scheduled to be changed blinks. When the conditions are met and the control mode change is performed, the lighting portion changes from the blinking state to a turned-on state.

Figure 20:
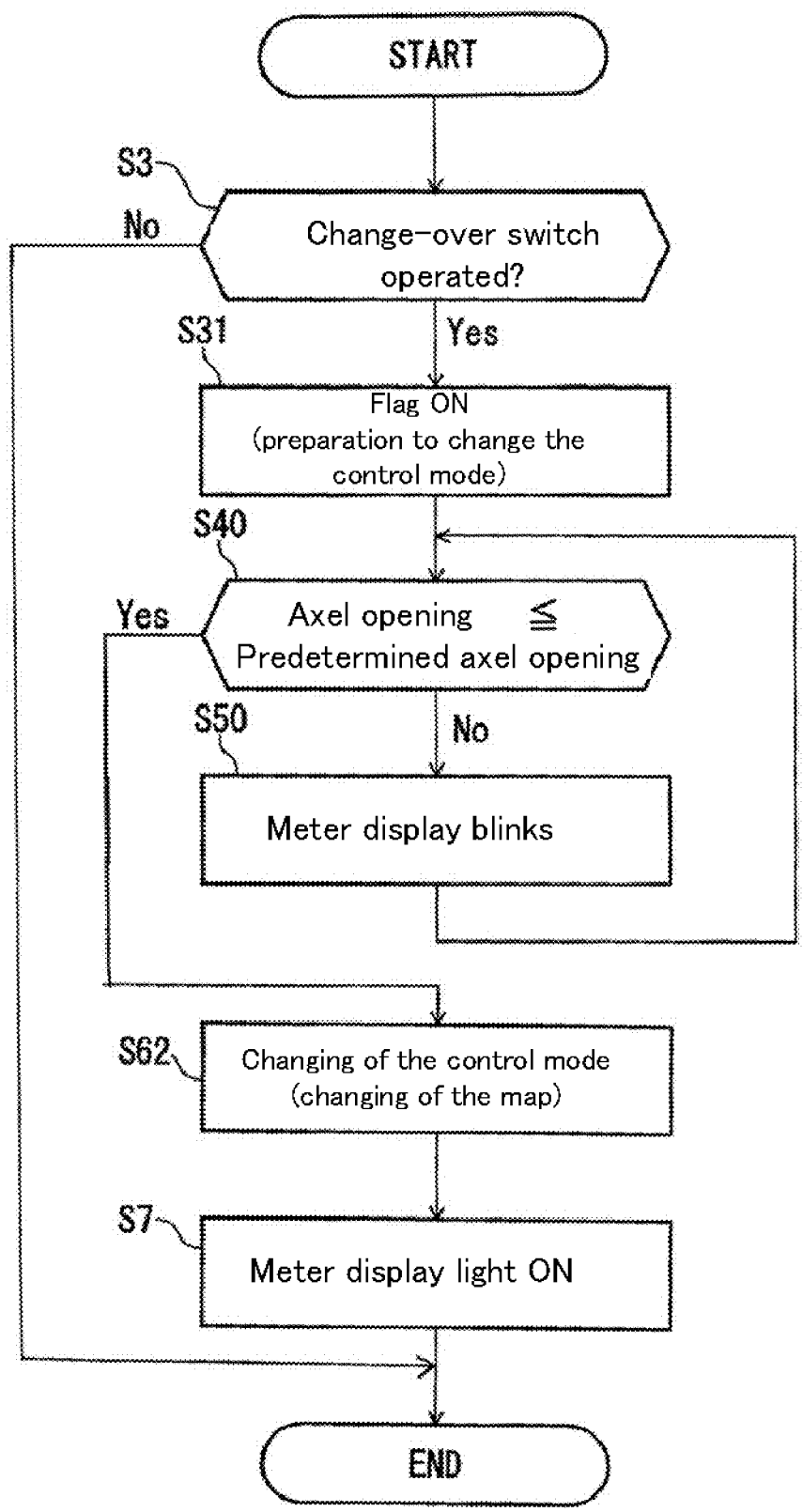
FIG. 20 is a flowchart of a mode change control according to Embodiment 3.

FIG. 20 is a flowchart showing the control for changing the control mode according to this embodiment. In this embodiment, when the judgment result at Step S40 is "No," the routine proceeds to Step S50. At Step S50, the aforementioned display is performed on the meter panel 20. That is, the lighting portion corresponding to the current control mode is turned off, and the lighting portion corresponding to the control mode after the change blinks. For example, if the current control mode is the mode A and the prepared control mode after the change is the mode B, when the flag is turned on at Step S31, the display is changed such that the turned-on state of the lighting portion showing the mode A changes to the blinking state of the lighting portion showing the mode B.

Figure 21:
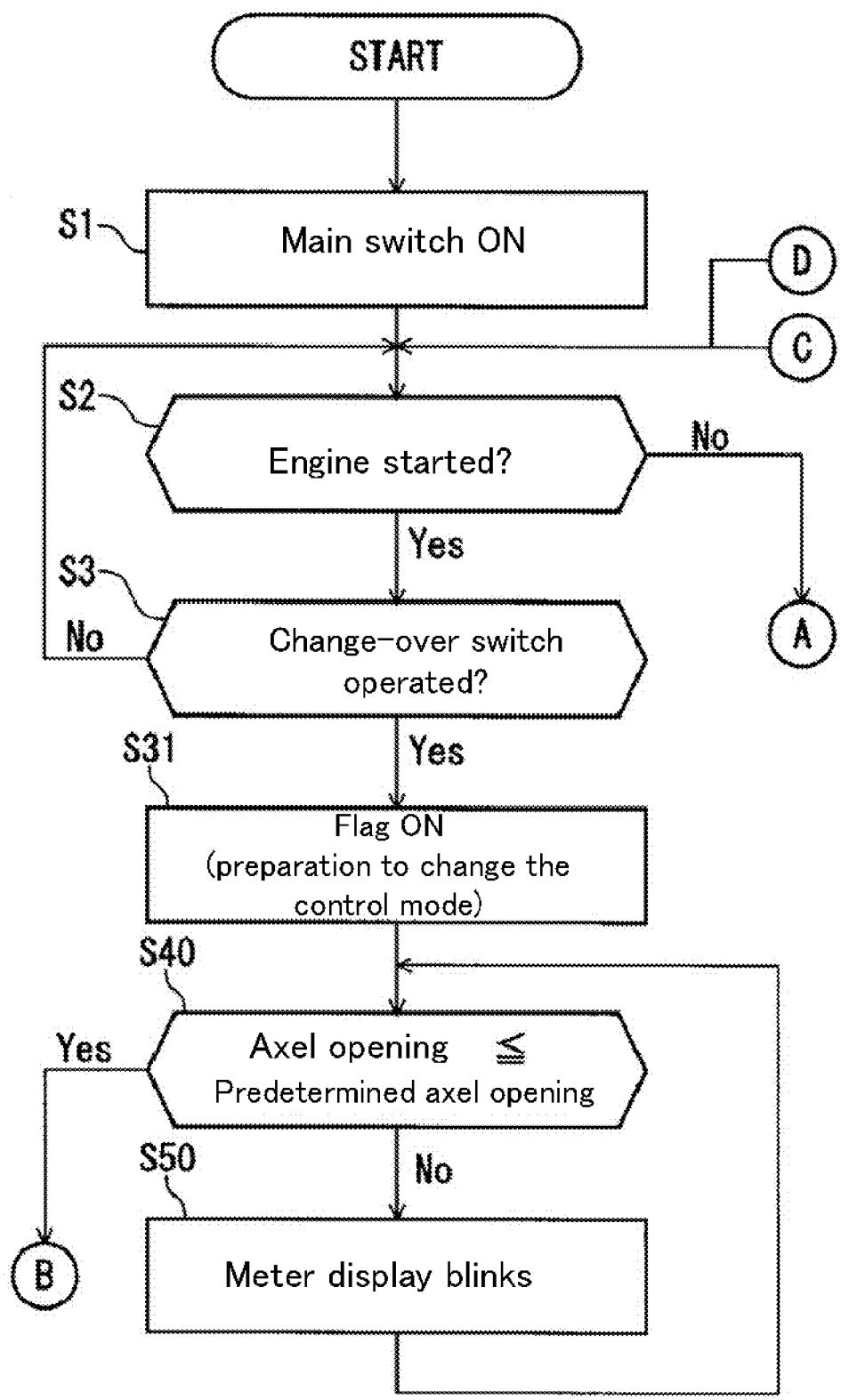
FIG. 21 is a flowchart of a mode change control and a meter panel display changing control according to Embodiment 3.
Figure 22:
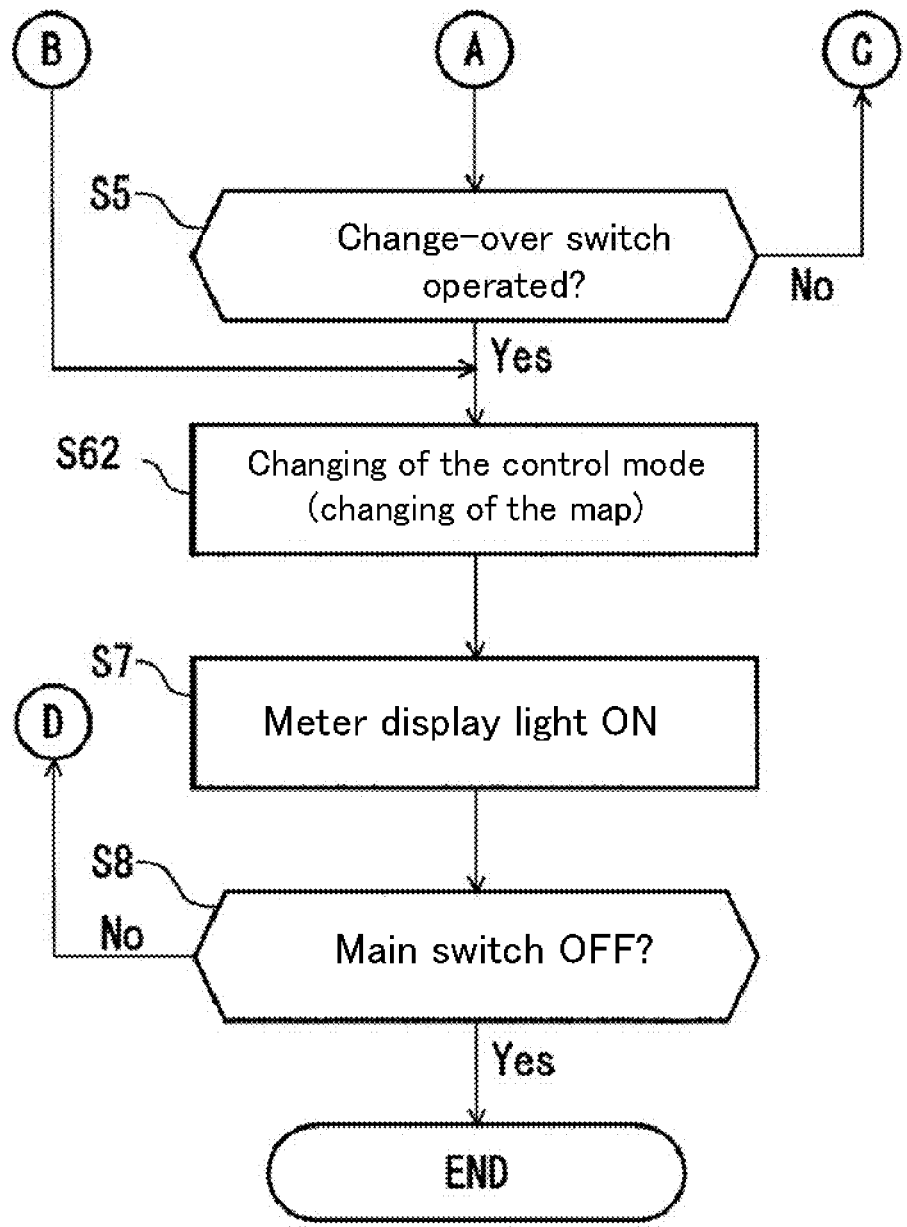
FIG. 22 is a flowchart of a mode change control and a meter panel display changing control according to Embodiment 3.

Next, other change control will be explained with reference to FIGS. 21 and 22. At Step S31, the flag for the preparation of the control mode change is turned on. When the flag is turned on, at Step S40, it is judged by the judgment portion 73a whether or not predetermined judgment conditions are met.

At Step S40, it is judged whether or not, for example, the opening degree of the axel 43 (see FIG. 17) is equal to or smaller than a predetermined opening degree. However, as described in each of the aforementioned modified examples, at Step S40, other judgment conditions can be used.

At Step S40, when the predetermined judgment conditions are met, the routine proceeds to Step S62. When the predetermined judgment conditions are not met, the routine proceeds to Step S50.

At Step S50, the display is changed such that the turned-on state showing the current control mode is changed to the blinking state showing the prepared control mode after the change. When the display on the mode display portion 32 is changed to the blinking at Step S50, the routine returns to Step S40. That is, while the change-over switch 122 is operated and the predetermined judgment conditions are not met, the lighting portion for the prepared control mode continues to blink.

At Step S62, the switching portion 73b performs the control mode change. At Step S62, the flag is turned off. When the control mode is changed, the blinking display of the mode display portion 32 changes to the lighting display (Step S7).

As described above, the meter panel 20 according to this embodiment makes the lighting portion corresponding to the control mode after the change blink when the control mode change is not performed regardless that the change-over switch 122 has been operated. The meter panel 20 changes the lighting portion from a blinking state to a lighted state if the control mode is changed thereafter. In this manner, the meter panel 20 can display that the control mode is not changed even if the change-over switch 122 has been operated and that the control mode is changed thereafter. This makes it possible to view whether or not the control mode has been changed. According to this embodiment, the control mode change timing becomes clearer.

Broad Scope of the Invention:

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A throttle control device, comprising:
a throttle operator for opening and closing a throttle valve;
a sensor for detecting an operation amount of the throttle operator;
a control device for controlling the throttle valve so that an opening degree of the throttle valve becomes a targeted throttle opening degree;
a memory device for storing information on a plurality of control modes in which the targeted throttle opening degree for the operation amount is determined;
a change-over instruction device for instructing changing of the control mode;
a judgment device for judging whether or not the operation amount of the throttle operator is equal to or less than a predetermined operation amount; and
a changing device for changing the control mode when the change-over instruction device is operated and the operation amount of the throttle operator is equal to or less than the predetermined operation amount.

2. The throttle control device of claim 1, further comprising a display device which displays the control mode after the control mode change when the control mode is changed.

3. The throttle control device of claim 1, wherein said predetermined operation amount involves that the operation amount of the throttle operator is substantially zero.

4. The throttle control device of claim 1, wherein the predetermined operation amount involves an operation amount of the throttle operator in which a vehicle equipped with the throttle control device cannot be driven with only a driving force of an engine of the vehicle.

5. The throttle control device of claim 1, wherein the predetermined operation amount involves an operation amount of the throttle operator in which an engine equipped with the throttle control device is in an idling state.

6. The throttle control device of claim 1, wherein the predetermined operation amount involves an operation amount of the throttle operator in which a running speed of a vehicle equipped with the throttle control device is essentially zero.

7. The throttle control device of claim 1, wherein, in cases where the operation amount of the throttle operator exceeds the predetermined operation amount when the change-over instruction device is operated, the aforementioned changing device changes the control mode when the operation amount of the throttle operator becomes equal to or smaller than the predetermined operation amount.

8. The throttle control device of claim 4, further comprising a display device for displaying that the control mode is not changed regardless that the change-over instruction device is operated and that the changing device changed the control mode.

9. The throttle control device of claim 1, wherein the memory device stores information on a first control mode, information on a second control mode in which a targeted throttle opening degree is larger than that in the first control mode, and information on a third control mode in which a targeted throttle opening degree is smaller than that in the first control mode.

10. A vehicle, comprising:
a throttle control device;
an engine in which a rotation speed changes depending on an opening degree of a throttle valve; and
a driving wheel which is driven by receiving a driving force of the engine,
wherein the throttle control device includes:
a throttle operator for opening and closing the throttle valve;
a sensor for detecting an operation amount of the throttle operator;
a control device for controlling the throttle valve so that an opening degree of the throttle valve becomes a targeted throttle opening degree;
a memory device for storing information on a plurality of control modes in which the targeted throttle opening degree for the operation amount is determined;
a change-over instruction device for instructing changing of the control mode;
a judgment device for judging whether or not the operation amount of the throttle operator is equal to or less than a predetermined operation amount; and
a changing device for changing the control mode when the change-over instruction device is operated and the operation amount of the throttle operator is equal to or less than the predetermined operation amount.

11. The vehicle of claim 10, wherein the vehicle is a straddle type vehicle.

12. The vehicle of claim 11, further comprising a handle having a left grip and a right grip on left and right end portions of the handle, respectively,
wherein the change-over instruction device is provided on a left side of the right grip of the handle, and is a switch to be operated with a right hand finger of a rider.

13. The vehicle of claim 12, wherein the right grip is rotatable and forms the throttle operator.

14. The vehicle of claim 10, further comprising a display device which displays the control mode after the control mode change when the control mode is changed.

15. The vehicle of claim 10, wherein, in cases where the operation amount of the throttle operator exceeds the predetermined operation amount when the change-over instruction device is operated, the aforementioned changing device changes the control mode when the operation amount of the throttle operator becomes equal to or less than the predetermined operation amount.

16. The vehicle of claim 15, further comprising a display device for displaying that the control mode is not changed regardless that the change-over instruction device is operated and that the changing device changed the control mode.

17. A vehicle equipped with an engine, a driving wheel driven by receiving a driving force of the engine, and a throttle control device,
wherein the throttle control device comprises:
a throttle operator for opening and closing a throttle valve;
a sensor for detecting an operation amount of the throttle valve;
a control device for controlling the throttle valve so that an opening degree of the throttle valve becomes a targeted throttle opening degree;
a memory device for storing information on a plurality of control modes in which a targeted throttle opening degree for the operation amount is determined;
a change-over instruction device for instructing changing of the control mode;
a judgment device for judging whether or not the driving force transmitted to the driving wheel is equal to or less than a predetermined value;
a changing device for changing the control mode to a changed control mode when the change-over instruction device is operated and the driving force transmitted to the driving wheel is equal to or less than a predetermined value; and
a display device which displays the changed control mode after the changing device has changed the control mode.

18. The vehicle of claim 17, wherein the judgment device judges that the driving force transmitted to the driving wheel is equal to or less than the predetermined value when a gear position of a transmission of the engine is in a neutral position.

19. The vehicle of claim 17, wherein the judgment device judges that the driving force transmitted to the driving wheel is equal to or less than the predetermined value when a clutch of the engine is in a disengaged status.

* * * * *